United States Patent [19]
Kamiya et al.

[11] Patent Number: 5,923,845
[45] Date of Patent: Jul. 13, 1999

[54] INTEGRATED ELECTRONIC INFORMATION SYSTEM

[75] Inventors: Kenichi Kamiya, Waltham, Mass.; Terry Winograd, Stanford, Calif.

[73] Assignee: NEC Corporation, Tokyo, Japan

[21] Appl. No.: 08/686,842

[22] Filed: Jul. 26, 1996

[51] Int. Cl.$^6$ .................................................. G06F 13/00
[52] U.S. Cl. .............................. 395/200.36; 395/200.3; 395/200.31; 395/200.35; 395/200.78; 379/93.15; 379/93.24
[58] Field of Search ........................ 395/200.36, 200.3, 395/200.31, 200.35, 200.78; 379/93.15, 93.24, 100.03

[56] References Cited

U.S. PATENT DOCUMENTS

| | | | |
|---|---|---|---|
| 5,060,150 | 10/1991 | Simor .................................. | 364/200 |
| 5,121,384 | 6/1992 | Ozeki et al. ........................... | 370/60 |
| 5,165,018 | 11/1992 | Simor .................................. | 395/200 |
| 5,170,252 | 12/1992 | Gear et al. ............................ | 358/181 |
| 5,230,048 | 7/1993 | Moy .................................... | 395/600 |
| 5,263,157 | 11/1993 | Janis ................................... | 395/600 |
| 5,333,266 | 7/1994 | Boaz et al. ............................ | 395/200 |
| 5,428,778 | 6/1995 | Brookes ................................ | 395/600 |

OTHER PUBLICATIONS

Grassroots User's manual for CS377C #1, pp. 1–9.
Kenichi Kamiya et al., "Grassroots: A System Providing a Uniform Framework for Communicating, Structuring, Sharing Information, and Organizing People", published Jan. 28, 1996, pp. 1–33, http://www–pcd.stanford.edu/Grassroots/WWW96/.
Article by Borenstein et al., entitled "Power, ease of use and cooperative work in a practical multimedia message system", 1991 Academic Press Limited, Int. J. Man–Machine Studies (1991) 34, pp. 229–259.
Book by Lamb et al., entitled "Lotus Notes Network Design", McGraw–Hill, 1996.
Article by Shipmann et al., entitled "Distributed Hypertext for Collaborative Research: The Virtual Notebook System", Hypertext for the Virtual Notebook, Hypertext '89 Proceedings, Nov. 1989, pp. 129–135.

*Primary Examiner*—Frank J. Asta
*Assistant Examiner*—Ivan C. Pierce, III
*Attorney, Agent, or Firm*—Skjerven, Morrill, MacPherson Franklin & Friel

[57] ABSTRACT

An electronic system using collectors, rosters, notifiers, and links provides a uniform system for communications, information management and human organization. Since the collectors have unique addresses, each collector belonging to a user can be used as a separate email inbox to provide a single user account with multiple email inboxes. Furthermore, collectors can have access control attributes to limit access to the collectors. The notifier provides a uniform location to view incoming new messages and documents. The links can be used to automatically transfer information between collectors as well as providing access authorization to collectors. For example, a link in subscription mode from a first collector to a second collector would automatically copy all documents placed in the second collector to the first collector. Similarly, if the same link were in forwarding mode, documents placed in the first collector are copied to the second collector. Rosters contain links to multiple collectors. A link to a roster is equivalent to a link to all the collectors linked in the roster. In addition sending a document to a roster is equivalent to sending a copy of the document to every collector linked in the roster.

16 Claims, 16 Drawing Sheets

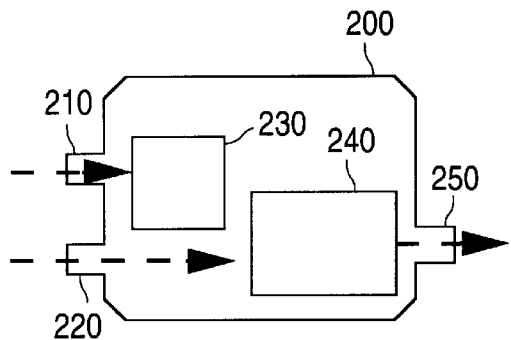
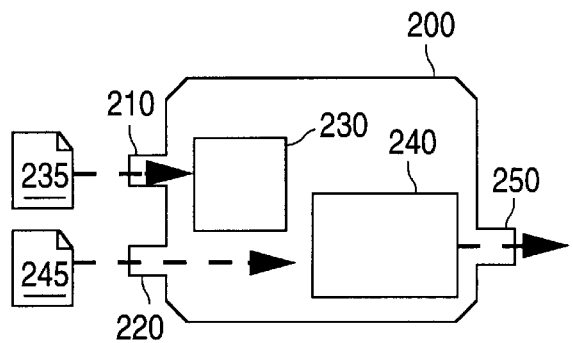
FIG. 2(a)  FIG. 2(b)
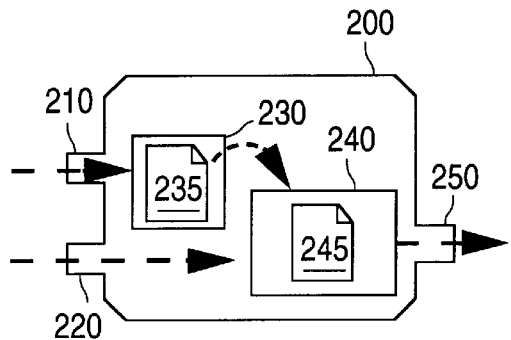
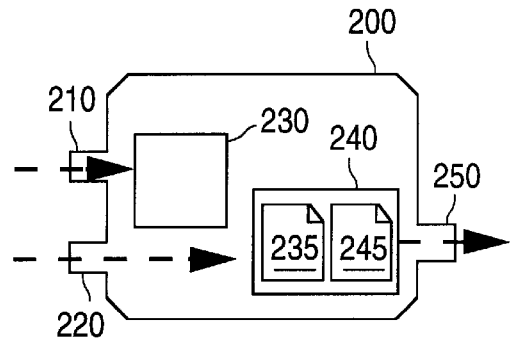
FIG. 2(c)  FIG. 2(d)
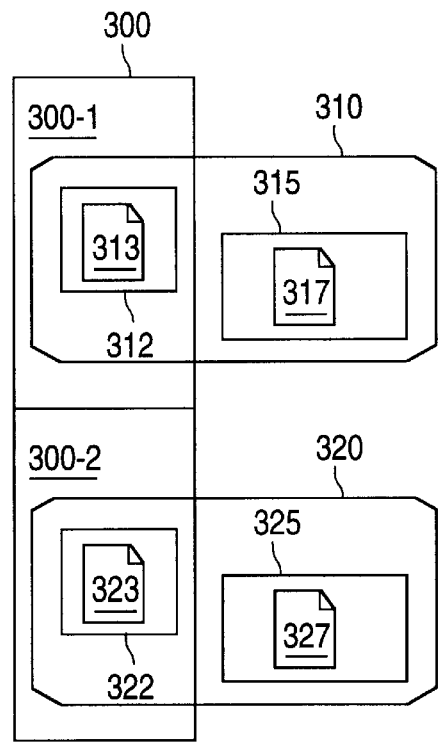
FIG. 3

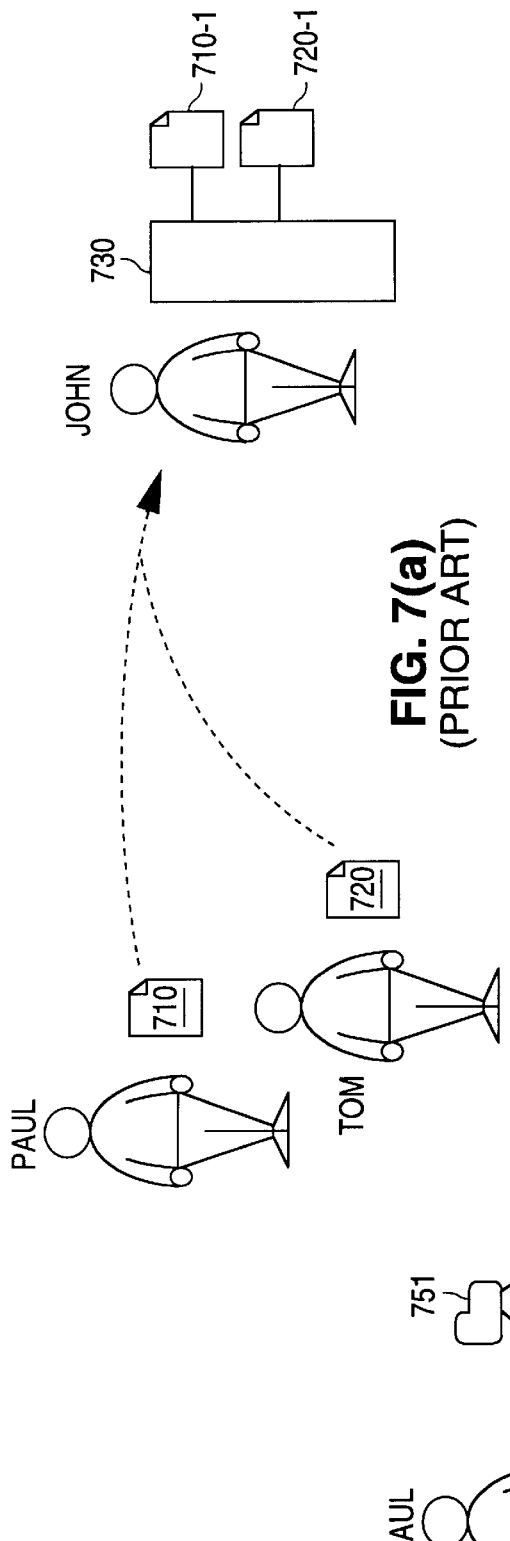
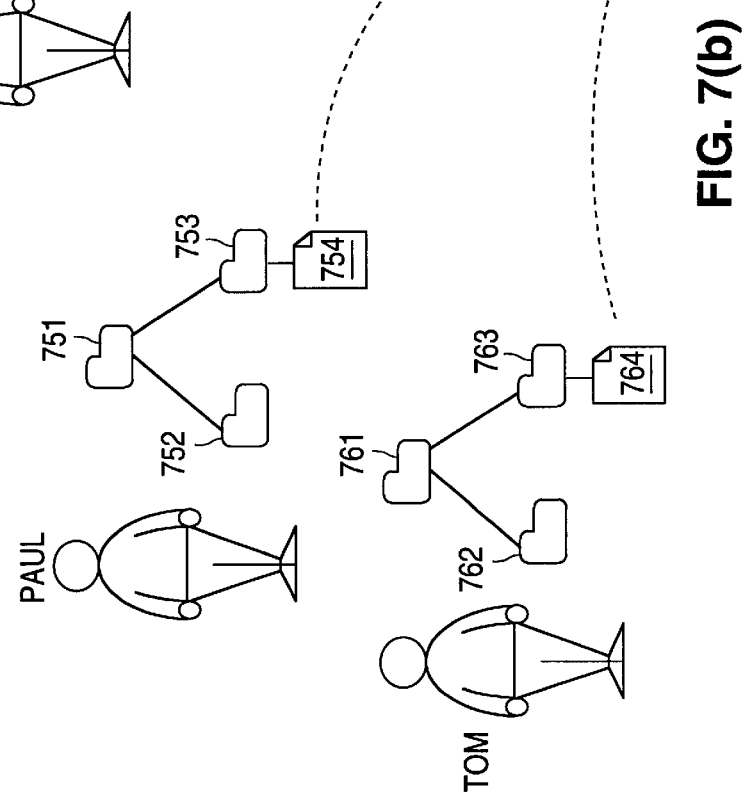
FIG. 7(a) (PRIOR ART)
FIG. 7(b)

INTEGRATED ELECTRONIC INFORMATION SYSTEM

CROSS REFERENCE TO MICROFICHE APPENDIX

Appendix A, which is a part of the present disclosure, is a microfiche appendix consisting of 2 sheets of microfiche having a total of 141 frames. Microfiche Appendix A is a listing of computer subroutines for embodiments of the system and process of this invention, which is described more completely below.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

This invention relates to communications, information management, and human organization, and more particularly to an electronic system of hierarchical documents, collectors, and rosters within a network to manage and disseminate information and communications.

2. Description of the Related Art

As computer networks have evolved into viable instruments for communicating, structuring and sharing information, various disparate information systems, such as electronic mail (email), usenet newsgroups, mailing lists, and web pages, were developed to facilitate communication and information management. Since the various systems were developed independently and for different purposes, these systems do not function collaboratively to the benefit of a user of the computer network.

Computer networks typically consists of two or more computers connected so that the two computers can communicate and share information with each other. However, most information systems can function on a single stand alone computer as well. Therefore, as used herein, computer network encompasses stand alone computers. Typically, users, normally humans but sometimes other computers, have one or more user accounts on one or more computers on the computer network. Users on a computer network can communicate and share information with each other through a variety of systems such as electronic mail, mailing lists, newsgroups, and the World Wide Web (WWW).

Electronic mail, or email, is used to communicate private messages between users on a computer network. Typically, email messages are originated by a single user but can be sent to one or more users. When a user receives an email message, the email message is placed in his email inbox and the user is notified of the incoming email message. Each user typically has only one email inbox for each user account. Therefore, all the email a user receives is placed in a single email inbox. The user must then manually sort through his email inbox to determine whether any high priority email has been received. If a user receives many incoming email messages, the user may miss important email messages.

A mailing list is a specialized use of email. Mailing lists are used to exchange information with every member of a specified group of users. The mailing list has a specific email address. Any email sent to the email address of the mailing list is forwarded to all members of the mailing list. Typically users who wish to be included on a mailing list must subscribe to the mailing list, by requesting the maintainer of the list to add the user's email address. To cancel a subscription the user must request that the maintainer of the list remove the user's email address. Subscription to mailing lists further compounds the problem of overcrowded email inboxes, since a user will receive even more email.

A common problem with mailing lists occurs when error messages bounce between the mailing list and an errant user. The bouncing error messages can cause many unwanted email messages to be sent to every member of the list. In such a situation a user may accidently delete important email messages in his attempt to remove all the unwanted error messages. Furthermore, the user can not unilaterally cancel his subscription to prevent the error messages from flooding his email inbox.

Another popular information system is the use of usenet newsgroups. A newsgroup consists of various articles sent by users from across the network. The usenet newsgroup information system was developed in an era when computers were connected temporarily at fixed intervals to exchange information. Thus to guarantee access to the newsgroups each computer had to obtain and maintain a local copy of the articles. World wide newsgroups such as those found on the internet are copied by a local news server for local area networks. A user has access to the local copy of the newsgroup on his local new server by running a news reader. Articles the user wishes to send to a particular newsgroup are eventually copied to all local news servers across the world which carry the particular newsgroup. Unlike a mailing list, the user who reads a newsgroup does not receive a personal copy of each article; rather, the user reads the copy on the local news server. Furthermore, typically the user is not notified of new articles until he uses his news reader to read the newsgroup.

A major limitation with the newsgroup system is the difficulty of creating new newsgroups. Since each article of each newsgroup must be copied to every local news server, all the news servers must be aware of a new newsgroup. The general system to create a new newsgroup is to post a proposal for the new newsgroup to any related group. Then, if users vote to approve the group, the group is promulgated across all the news servers. Typically, if only a small number of users wish to use the proposed new newsgroup, the new newsgroup will not be approved. Furthermore, if there is a similar newsgroup in existence the new newsgroup is typically not approved.

Since any user can post to a newsgroup, a newsgroup is often filled with unrelated or unimportant articles; therefore, a user is often forced to skim through many worthless articles to read the few good articles. In response to this problem, moderated newsgroups were created. A moderated newsgroup is identical to a normal newsgroup except that all articles are reviewed by the moderator of the newsgroup. If the article satisfies the criteria of the news group, the article is released to the local news servers.

Another system for exchanging information on a computer network is the World Wide Web (WWW). The WWW uses makes use of hypertext markup language (HTML) to create various HTML documents known as "web pages." Each web page has a unique address known as a uniform resource locator (URL). HTML makes use of tags to mark text in various ways, such as headings, paragraphs, lists, underlining, and bolding. HTML also includes tags for images, forms and links to other documents. A particular web page can use an HTML link to connect to other web pages.

Computers with web pages must have a web server to handle requests for the web pages. Users accessing web pages use a web browser. The web browser and the web server communicate using a hypertext transfer protocol (HTTP). Typically, a user will supply a URL with the address of a web page to the web browser. Then, the web browser contacts the web server containing the web page to request a copy of the web page. The web server then sends the web page to the browser, which displays the page to the user. As used herein, "displaying" an item, can include, for example, actually showing the contents of the document, showing a symbolic representation of the document, showing the title of the document, showing information about the document, or a combination thereof. If the user finds the web page valuable, the user can store the URL as a "bookmark" so that the user can easily return to the web page. A typical web page will contain links to other web pages. A user can easily instruct the web browser to retrieve the linked web pages or the user can supply another URL for another web page.

Web pages have become popular due to the ease of navigating to various web pages. Furthermore, construction of web pages is not overly complex. Even an individual user has the ability with the WWW to "publish" a page to the world on any subject the user desires. In addition, various services, such as databases of web pages and key word searching of web pages, are available.

However, the WWW has many limitations that may hinder its usefulness. For example, most web pages are updated at various intervals. However, no notification feature is available to alert users who frequent a particular web page that the web page has been updated. Therefore, a user who wishes to read the page after each update must manually request the web page at various intervals to be sure that the most recent updates are received.

Another limitation is found in current browser implementations. As mentioned above, a user can save "bookmarks" on pages he finds of interest. However, current browsers save all the "bookmarks" into one flat file. Therefore, if the user desires a hierarchical arrangement of his bookmarks he must manually edit the bookmarks in a different HTML document.

As mentioned above, the various systems for communication and information management on computer networks were designed for different purposes. Therefore, a user does not have a uniform system for communicating and sharing information. Furthermore, each system has certain limitations that prevent the systems from performing optimally for the user.

Hence there is a need for a method or system to unify and enhance or replace the current disparate systems users of computer networks employ for communication and information management on the computer network.

SUMMARY OF THE INVENTION

In accordance with this invention, an electronic system for communications and information management is provided to unify and improve disparate conventional systems. In one embodiment, an electronic system for receiving electronic information is designed to replace conventional email systems. Specifically, the system provides one or more electronic information collectors in a user account. Each of the electronic information collectors can be used as a separate email inbox since each electronic information collector has a unique address. Furthermore the electronics information collectors can be hierarchical, so that one electronic information collector is contained within another electronic collector.

For example, a user can use a first electronic information collector having a first collector address as an email inbox for one purpose and a second electronic information collector having a second collector address for a second purpose. An electronic message sent to the first collector address is received in the first collector. An electronic message sent to the second collector address is received in the second collector.

In another embodiment, the electronic system for receiving information contains a notifier. The notifier is divided into notifier sections. Each notifier section is associated with an electronic information collector. Electronic messages sent to an electronic information collector are displayed in the notifier section associated with the electronic information collector.

In another embodiment, the electronic information collectors of the system have a paste input port and a post input port. Electronic messages received in the paste input port of a first electronic information collector are displayed in the first electronic information collector. Electronic messages received in the post input port of the first electronic information collector are displayed in the notifier section associated with the first electronic information collector.

The principles of the present invention can also be used to develop an electronic information management system. In one embodiment, the electronic information management system uses collectors, rosters and links. The collectors can have access control attributes such as read protection, write protection, paste protection, or post protection. The links can have attributes to control flow direction such as subscription and forwarding. The links can also have attributes to control notification and authorization attributes such as read authorization, write authorization, paste authorization, and post authorization.

One implementation of the electronic information management system contains a first collector, a second collector, and a link having a flow direction attribute from the first collector to the second collector. If the flow direction attribute of the link is in forward mode, a document placed in the first collector is automatically copied into the second collector. If the flow direction attribute of the link is in subscription mode, a document placed in the second collector is automatically copied into the first collector. The collectors can be either in the same user account or in different user accounts. For example the first collector can be in a first user account and the second collector can be in a second user account.

In another embodiment of the electronic system of information management, a first notifier section is associated with the first collector and a second notifier section is associated with the second collector. If the collectors are in the same user account then the first notifier section and the second notifier section are in a single notifier. Otherwise the first notifier section is in a first notifier and the second notifier section is in a second notifier. In this embodiment, links in the system also have a notification attribute. If the notification attribute is activated documents copied across a link to a collector are placed in the notifier section associated with the collector rather than in the collector.

In another embodiment, the collectors of the electronic information management system have a read protection attribute and a write protection attribute. The links of the electronic information management system can have the additional attributes of read authorization and write authorization. If a first user account has the read protection attribute of a first collector activated then a second user account is unable to read the first collector unless a link with the read authorization attribute activated exists from the first collector to a second collector belonging to the second user account. Similarly, if a first user account has the write protection attribute of a first collector activated then a second user account is unable to write to the first collector unless a link with the write authorization attribute activated exists from the first collector to a second collector belonging to the second user account. In other words, a specific read authorization or write authorization, given to a second user account by a link from a read or write protected collector to a collector belonging to the second user account, overrides the general read protection or write protection attribute of the protected collector.

Other embodiments of the present invention are further enhanced by rosters. A roster can be used to forward documents to a group of different collectors or to subscribe to documents from a group of users. Specifically, a roster is a special type of collector which contains links to other collectors. Creating a link to a roster is equivalent to creating a link with the same attributes to each collector linked to the roster. Furthermore, posting an item to a roster is equivalent to posting the item to each collector linked to the roster. Similarly, pasting an item to a roster is equivalent to pasting the item to each collector linked in to the roster.

For example, in one embodiment, a roster has a roster address, a first link to a first information collector and a second link to a second information collector. A message sent to the roster address is copied to the first electronic information collector and the second information collector.

In another embodiment, a first collector has an activated read protection attribute. A roster has a first link to a second collector belonging to a second user account. The roster also has a second link to a third collector belonging to a third user account. The first collector is connected to the roster by a third link. The second user account and the third user account can not read the first collector unless they are authorized to by an authorization link. For example, if the third link has an activated read authorization attribute, the second user account and the third user account can read the first collector.

BRIEF DESCRIPTION OF THE DRAWINGS

FIGS. 2(a)–2(d) show a conceptual model of a collector in accordance with one embodiment of the present invention.

FIG. 3 shows a conceptual model of a notifier in accordance with one embodiment of the present invention.

FIG. 7(a) shows a conceptual model of conventional email system.

FIG. 7(b) shows a conceptual model of an email system in accordance with one embodiment of the present invention.

DETAILED DESCRIPTION

According to the principles of this invention, the inefficiencies and limitations of conventional disparate systems for communication and information management on computer networks have been overcome. The present invention provides a hierarchical collection of folders, each of which can act as a separate email inbox. Furthermore, the present invention provides a uniform notifier for incoming email, new articles in newsgroups, and updated web pages. In addition, the present invention provides a unique roster feature which allows broadcasting of information to a group of users. The features of the invention are accomplished by use of a novel interlink structure with independent access and flow controls.

A key component of the present invention is the electronic information collector, hereinafter called collector. Each collector has a distinct address usually in the form of a uniform resource locator (URL). A collector holds a collection of electronic information. The information in a collector can be, for example, documents or articles, such as text files, sound files, graphics files, or video files, links to other collectors, links to other objects such as web pages, links to users, or other collectors. A user can have as many collectors as the user wishes. Typically the user's collectors will be arranged hierarchically with a single root collector. Within a collector a user can create objects such as documents, articles, links, and other collectors. Furthermore, the user can use a "clipboard" to cut, copy, and paste objects. The clipboard is a temporary storage device used to store a copy of the cut or copied object. The user can also post objects as explained below.

A special type of collector is a roster. A roster contains links to other collectors. Rosters can also contain other rosters or links to other rosters. Most systems in accordance with the present invention, maintain some standard rosters, for example, a system-wide roster with links to one collector of every user of the system. The advantages of using rosters are explained in detail below.

Other important components of the present invention include a uniform notifier and links. Each user has a uniform notifier which contains all the changes which may have occurred in any of the user's collectors. Links are used to interconnect various collectors as well as documents such as articles or external objects such as web pages.

Figure 1:
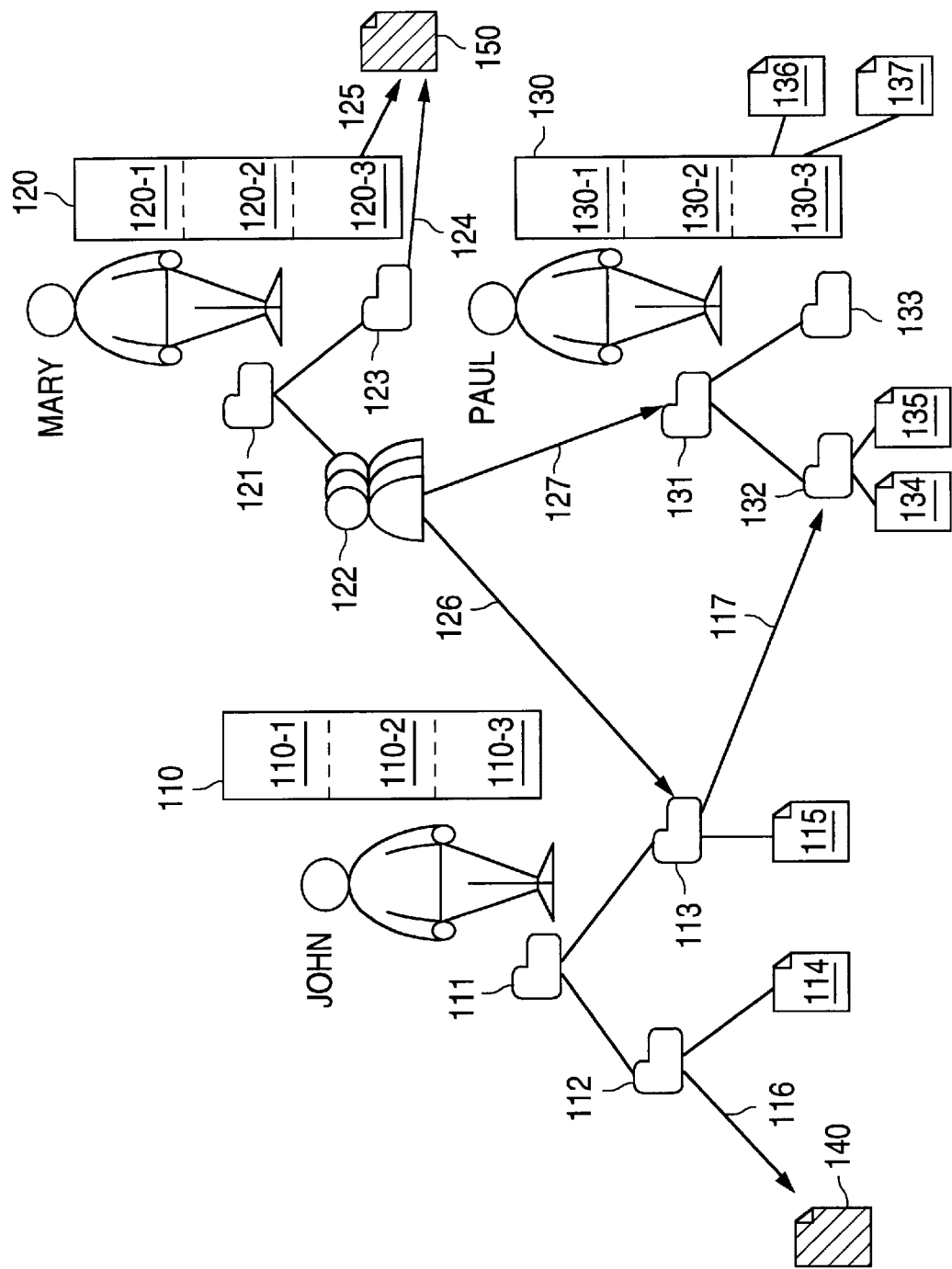
FIG. 1 shows some of the important components which can be used in a system in accordance with the present invention.

FIG. 1 illustrates some of the important components which can be used in a system in accordance with the present invention. As used herein, a user's name is equivalent to the user's account. Although a user may have more than one account in the examples herein each user has only one account. John has notifier 110. John also has root collector 111, which contains collector 112 and collector 113. Collector 112 contains document 114 and link 116, which points to object 140. Collector 113 contains document 115 and link 117, that points to collector 132 belonging to Paul. A user is able to create additional collectors or rosters at any point in the user's collector hierarchy. Notifier 110 is divided into three notifier sections Notifier section 110-1 is associated with root collector 111; notifier section 110-2 is associated with collector 112; and notifier section 110-3 is associated with collector 113. In some embodiments of the invention, notifier sections are created automatically whenever a collector is created. In other embodiments, notifier sections can be selectively created by a user so that only some collectors have associated notifier sections.

Similarly, Mary has notifier 120 and root collector 121, which contains roster 122 and collector 123. Roster 122, contains link 126 to collector 113 and link 127 to collector 131. Collector 123 contains link 124 to external object 150. As shown in FIG. 1, notifier section 120-3, which is associated with collector 123, also contains link 125 to external object 150. However external link 125 is not visible in collector 123 (as explained in more detail below). Link 125 to external object 150 appears in notifier section 120-3 under three circumstances. First, a user may have posted (as explained below) a link to external object 150 to collector 123. Second, if collector 123 has a subscription link with notification (as explained below) to a collector and a link to external object 150 is added to that collector, link 125 is created in notifier section 120-3. Third, if collector 123 is the information destination collector of a forwarding link with notification (as explained below) from a collector in which a link to external object 150 is added, link 125 is created in notifier section 120-3.

Paul has notifier 130 and root collector 131, which contains collector 132 and collector 133. Collector 132 contains document 134 and document 135. Notifier section 130-3, which is associated with collector 133, contains document 136 and document 137. Document 136 and document 137 are documents which another user wished to place in Paul's collector 133. As explained in detail below, document 136 and document 137 are not visible in collector 133. However, the documents are visible in notifier section 130-3.

FIG. 2, illustrates a conceptual model of a collector 200. As shown in FIG. 2(a), collector 200 can be conceptualized as having new storage area 230, persistent storage area 240, post input port 210, paste input port 220, and output port 250. As shown in FIGS. 2(b) and 2(c), document 245 which enters paste input port 220 is placed into persistent storage area 240. Documents in persistent storage area 240 are visible to users viewing collector 200.

As shown in FIG. 2(b) and 2(c), document 235, which enters collector 200 through post input port 210, is placed in new storage area 230. Documents in new storage area 230 are not normally visible to the users viewing collector 200. However as explained below with respect to FIG. 3, documents which are posted to a collector appear in the notifier section associated with that collector. Thus, if collector 200 is used as an email inbox, the user who owns collector 200 would not activate the post protection attribute (as explained below) on collector 200 so that users are able to post into collector 200. As documents are posted into collector 200, the documents are displayed in the notifier section associated with collector 200 so that the user can view all incoming documents in a single place. As used herein, "displaying" an item, can include, for example, actually showing the contents of the document, showing a symbolic representation of the document, showing title of the document, showing information about the document, or a combination thereof. The user who owns collector 200 can move document 235 from new storage element 230 into persistent storage area 240 by using an "accept" command as illustrated in FIGS. 2(c) and 2(d) and explained in more detail below. Conceptually, documents which are removed from or copied from collector 200 exit collector 200 through output port 250.

FIG. 3, illustrates a conceptual model of notifier 300. Notifier 300 is separated into notifier section 300-1, which is associated with collector 310, and notifier section 300-2, which is associated with collector 320. Conceptually, new storage area 312 of collector 310 is located within notifier section 300-1. Similarly, new storage area 322 of collector 320 is located within notifier section 300-2. As mentioned above, document 313, which is located within new storage area 312, is not normally visible when a user views collector 310. Similarly, document 323, which is located in new storage area 322 is not normally visible when a user views collector 320. However, document 313 and document 323 are visible when a user views notifier 300.

When a user views a notifier, the user is given command options such as accepting, replying to, cutting, and copying the documents in the notifier. If the user elects to accept a document, the document is moved from the new storage area to the persistent storage area. If the user replies to a document, the user is prompted to create a second document which is posted back to the source of the document in the notifier. If the user copies a document, the document is copied into the clipboard without removing the document from the notifier. If the user cuts a document, the document is removed from the new storage area and placed in the clipboard. Consequently, the cut document no longer appears in the notifier. The user can also choose to ignore the document in which case the document remains in the new storage area and remains visible in the notifier. In some embodiments of the invention, a notifier distinguishes documents that were skipped from new documents which arrived after the user last viewed the notifier. Typical ways to distinguish the documents are using different colors, bolding, underlining, or tagging either the new or skipped documents.

Since each collector can have an associated notifier segment in the notifier, the user can receive notification of all new communications the user has received in a central location. As described below, the user can use collectors as email inboxes so that the notifier contains the user's incoming email sorted in the various notifier sections. Furthermore, as described below, collectors can be used to replace newsgroups. Therefore, the user can also view news articles through the notifier. In some embodiments of the invention, the system signals the user of incoming email and new news articles. For example, the system can cause the computer that the user is using to display a message, flash a signal, or make a sound when the user's notifier receives new entries. Thus, a notifier in accordance with this invention provides a central location for new communications or information from disparate information and communication systems. Furthermore, a system in accordance with this invention can be configured to signal a user of incoming communications or information.

Figure 4:
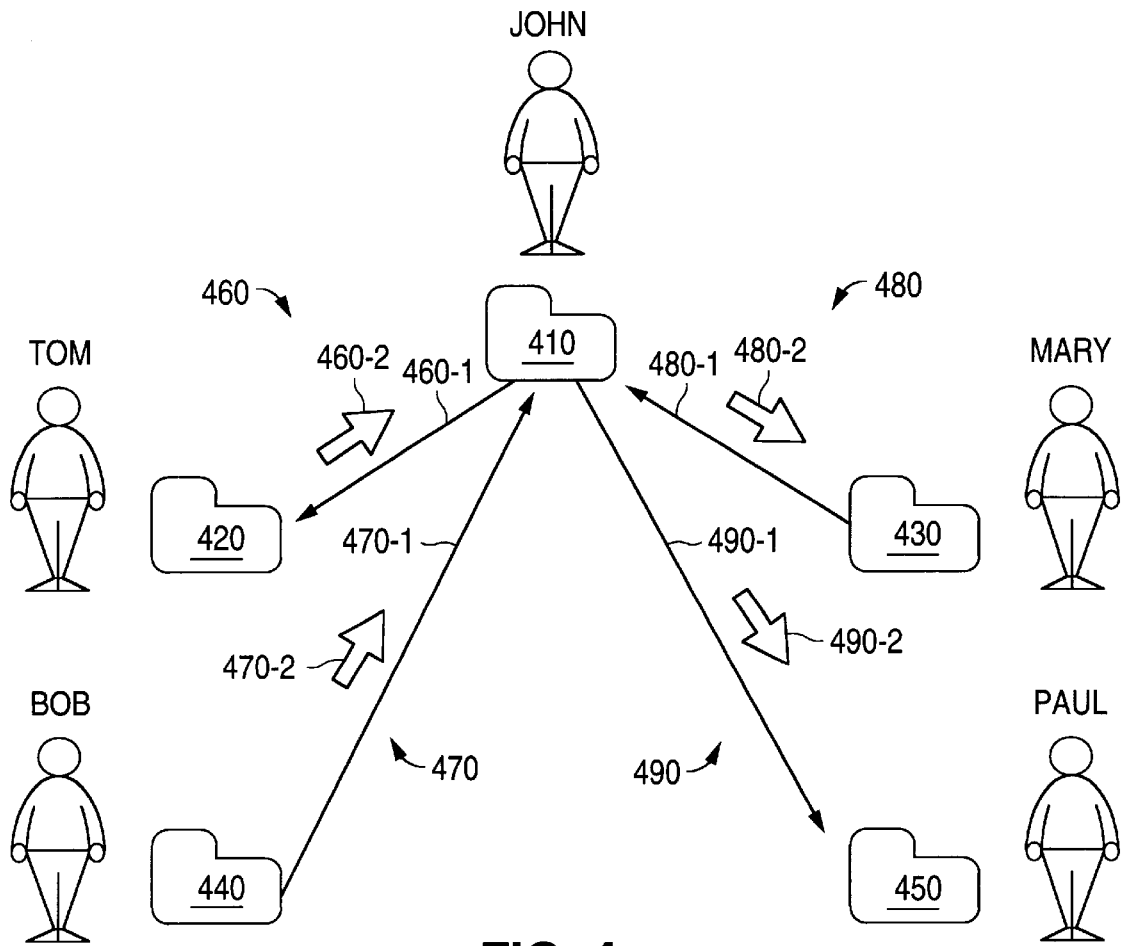
FIG. 4 shows a conceptual model of the links in accordance with one embodiment of the present invention.

FIG. 4, illustrates a conceptual model of various links used in accordance with some embodiments of the present invention. Links in accordance with some embodiments of the present invention are able perform several functions. Some links are used to cause the automatic transfer of information between collectors. Other links are used to give access control authorization to users. In most embodiments, links are capable of performing multiple functions simultaneously based on which of the link's attributes are activated (as explained in detail below). For example, a single link can be used to give access control authorization and cause the automatic transfer of information.

Link 460 and link 470 illustrate information transfers into collector 410, while link 480 and link 490 indicate information transfer out of collector 410. Each link is represented by a link origination arrow and an information direction arrow. The information direction arrow, illustrated as a large empty arrow, indicates the direction of information flow. The link origination arrow, illustrated as a thin solid arrow indicates, the origination of the link. The direction of information flow is controlled by various attributes of the link which are explained more fully below.

Link 460 connects collector 410 and collector 420. Since link origination arrow 460-1 points to collector 420, link origination arrow 460-1 indicates that link 460 originates from collector 410 and connects to collector 420. Therefore, collector 410 is the link source collector, and collector 420 is the link destination collector. Information direction arrow 460-2 indicates that information is copied from collector 420 into collector 410. Therefore, collector 420 is the information source collector and collector 410 is the information destination collector. Since link 460 originates from collector 410 while the information copied by link 460 originates from collector 420, link 460 is a subscription link because collector 410 subscribes to the information in collector 420.

Link 470 connects collector 440 to collector 410. Link origination arrow 470-1 indicates that link 470 originates from collector 440 and connects to collector 410. Information direction arrow 470-2 indicates that the flow of information is from collector 440 to collector 410. Therefore, link 470 is a forwarding link, since information in collector 440 is copied and forwarded to collector 410.

Link 480 provides an information outflow link for collector 410. Specifically, as indicated by link origination arrow 480-1, link 480 originates from collector 430. Information direction arrow 480-2 indicates that information is copied from collector 410 to collector 430. Therefore, link 480 is a subscription link used to subscribe to information in collector 410.

Link 490 also provides an information outflow link for collector 410. However, link 490 originates from link 410 as indicated by link origination arrow 490-1. Therefore, link 490 is a forwarding link used to copy and forward information from collector 410 to collector 450.

A link between collectors can be operated in multiple modes which can be characterized by different attributes. The subscription and forwarding attributes control the direction information is transferred across a link. If a link is created with the forwarding attribute activated, new information added to the persistent storage area of the link source collector of the link will be copied and forwarded to the link destination collector. In other words with a forwarding link (a link with the forwarding attribute activated), the link destination collector receives a copy of any new information placed in the persistent storage area of the link source collector. Whether the new information is transferred to the persistent storage or new storage area of the link destination collector is controlled by the notification attribute as explained below.

If a link is created with the subscription attribute activated, new information added to the persistent storage area of the link destination collector of the link is copied to the link source collector. In other words with a subscription link, the link source collectors subscribes to and receives new information placed in the persistent storage area of the link destination collector. Whether the new information is copied to the new storage area or the persistent storage area of the link source collector is controlled by the notification attribute as explained below.

A second attribute of links is the notification attribute, which controls whether information transferred across the link is shown in the notifier of the user who owns the information destination collector. As explained above, a transfer with notification, i. e. a post transfer, enters the information destination collector through post input port 210 (FIG. 2) and is placed in new storage area 230. The posted information is visible in the notifier section associated with the information destination collector but normally not in the information destination collector. Thus a link with the notification attribute activated uses post transfers to place the new information in the new storage area of the information destination collector.

A transfer without notification, i. e. a paste transfer, enters the information destination collector through paste input port 220 (FIG. 2) and is placed in persistent storage area 240. The pasted information is visible in the information destination collector. Thus, a link without the notification attribute activated uses paste transfers to place the new information into the persistent storage area of the information destination collector.

Various implementation of the attributes are possible. In one embodiment of the invention, notification attribute is combined with the subscription and forwarding attributes. Therefore, each link has four switches which can be activated or deactivated to control the attributes as follows: (1) subscription with notification, (2) subscription without notification, (3) forwarding with notification, and (4) forwarding without notification. In this implementation a link can be both a forwarding link and a subscription link. When a link is used as both a subscription link and a forwarding link, information transferred on the link from the first collector to the second collector are not retransferred back to the first collector. In another embodiment the subscription and forwarding attribute are combined into a switch so that each link can only set to forwarding or subscription but not both. In this embodiment the notification attribute is controlled by a switch which can be activated or deactivated. In another embodiment the notification, subscription, and forwarding link are combined into two three way switches. The first switch controls subscription with the options of subscription with notification, subscription without notification, and no subscription. The second switch controls forwarding with the options of forwarding with notification, forwarding without notification, and no forwarding. Those skilled in the art can create other implementation of the various attributes of the links described herein in accordance with the principles of this invention.

Another important feature in the present invention is access control for the collectors and links. Each collector can have attributes for paste protection, post protection, read protection. Paste protection prevents unauthorized users from pasting into a paste protected collector. Post protection prevents unauthorized users from posting into the post protected collector. Read protection prevents unauthorized users from reading a read protected collector. In most embodiments the user who owns a collector is not restricted by the access control attributes of the collector. However, in some embodiments differing level of access control is provided so that the user can differing level of read protection, paste protection, and post protection. In the highest level of protection even the user who owns the collector is restricted by the access control. In most embodiments of the invention activating access control on a collector automatically changes the access control of articles and documents within the collector to match the access control of the collector.

Each link can have attributes for read authorization, paste authorization, and post authorization. In most embodiments of the invention link authorization has precedence over collector protection of the link source collector. Thus, an authorization link gives the user who owns the link destination collector authorization to access the link source collector.

For example, if read protection is set on collector 410 of FIG. 4, link 490 could be set with read authorization to allow documents to flow from collector 410 to collector 450 since link 490 originated from collector 410. However, link 480 is prevented from reading collector 410 since link 480 originates from collector 430. However, John, who owns collector 410, can authorize Mary, the owner of collector 430, to read collector 410 by creating a separate authorization link originating from collector 410 to collector 430 or to any other collector belonging to Mary with read authorization set. If such an authorization link is created, link 480 will function to subscribe to information from collector 410 to collector 430.

Similarly, if paste protection is set on collector 410, paste authorization on link 460 would allow information in collector 420 to be transferred into the paste input port of collector 410, since link 460 originates from collector 410. However, since link 470 originates from collector 440, no information can pass into the paste input port of collector 410, unless a separate authorization link originating from collector 410 to collector 440 (or another collector belonging to Bob) gives paste authorization to Bob, who owns collector 440. Post protection and post authorization would exhibit the same behavior. In some embodiments post protection and paste protection are combined into a single write protection. Similarly, post authorization and paste authorization are combined into a single write authorization. Also in some embodiments, activating read protection automatically activates write protection on a collector. Similarly, in these embodiments activating write authorization automatically activates read authorization.

In some embodiments of the invention, links can have negative authorization. For example, a user can have a collector without post protection activated. Normally any user can then post articles into the collector. However the user can create a negative authorization link to specifically deny post authorization to the user who owns a particular collector. This feature is useful to prevent another user from abusing a collector. Similar negative authorization is available for reading and pasting.

Figure 5A:
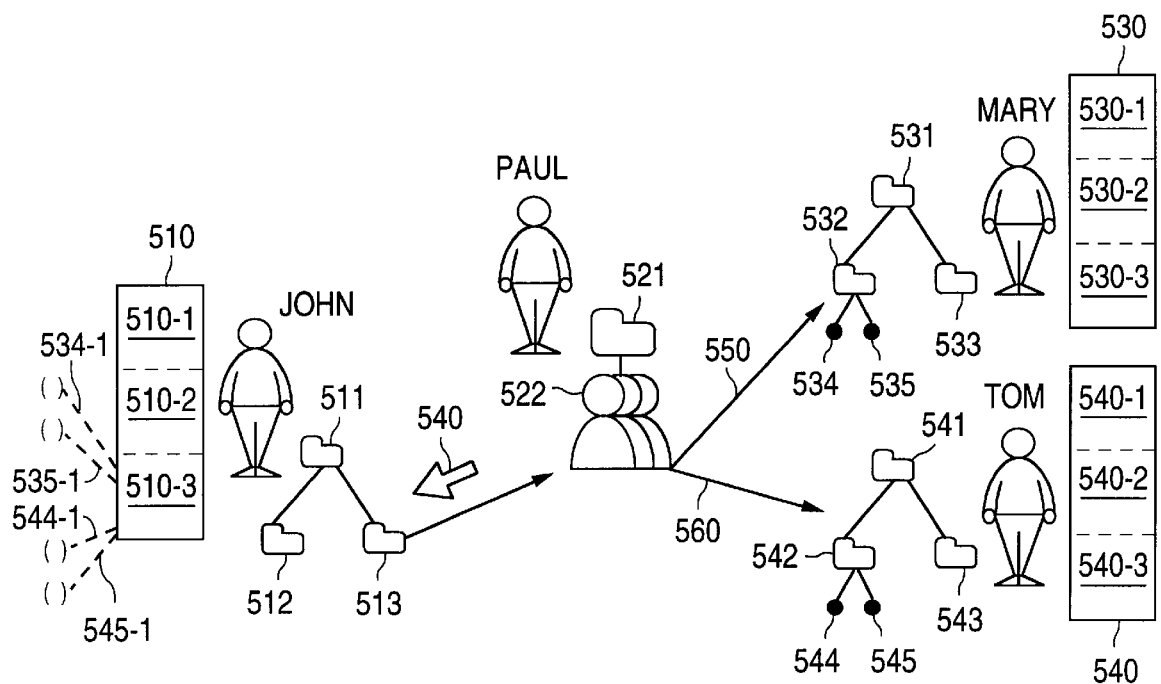
FIGS. 5(a) and 5(b) show the use of a roster to transfer information in accordance with one embodiment of the present invention.
Figure 5B:
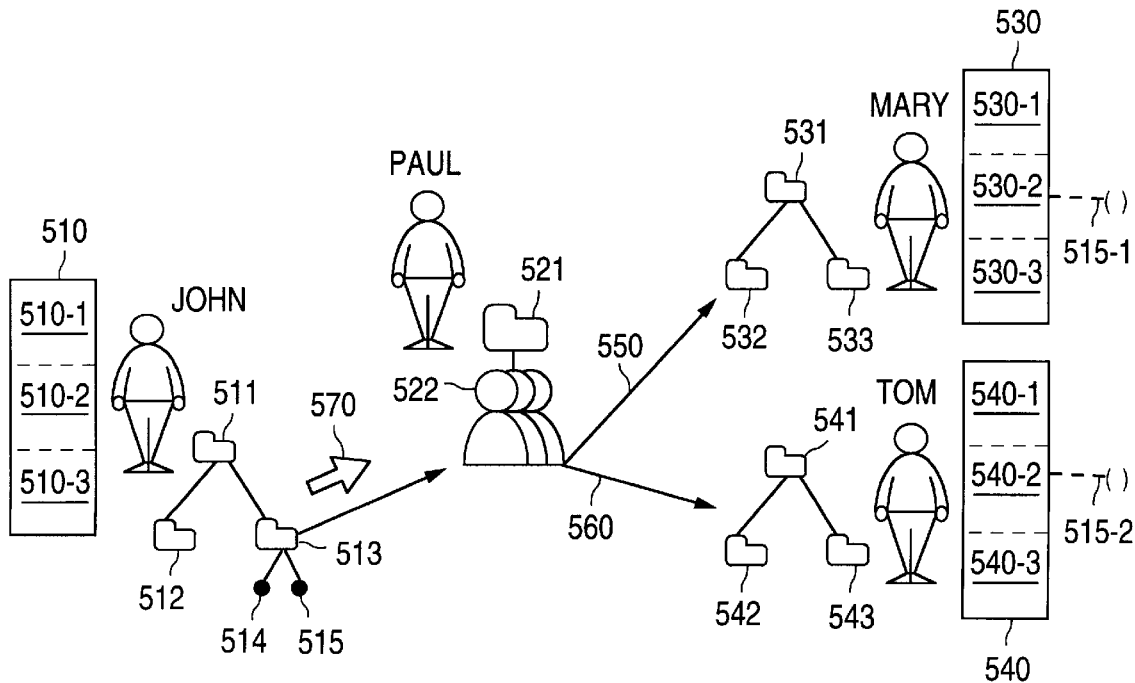

A roster can be used to forward documents to a group of different collectors or to subscribe to documents from a group of users. As explained above, a roster is a special type of collector which contains links to other collectors. Creating a link to a roster is equivalent to creating a link with the same attributes to each collector linked to the roster. Furthermore, posting an item to a roster is equivalent to posting the item to each collector linked to the roster. Similarly, pasting an item to a roster is equivalent to pasting the item to each collector linked in to the roster. FIG. 5(*a*) illustrates the use of a roster to collect information from multiple collectors. Paul has created roster 522, which contains link 550 to collector 532 and link 560 to collector 542. John can use Paul's roster 522 by creating link 540, which originates from John's collector 513. John can determine the attributes of link 540 such as whether link 540 forwards or subscribes to information and whether link 540 functions with or without notification. Creating link 540 to roster 522, is equivalent to creating separate links with identical attributes to each collector linked in roster 522, i. e. collector 532 and collector 542. Thus in FIG. 5(*a*) if link 540 is made with attributes to subscribe to information with notification to roster 522, link 540 is equivalent to a separate link to collector 534 and a separate link to collector 544 to subscribe to information with notification. Therefore, documents placed in the persistent storage area of collector 534 or the persistent storage area of collector 544, after the creation of link 540, such as documents 534, 535, 544, and 545, are posted to the new storage area of collector 513. Thus notifier section 510-3, which is associated with collector 513, displays documents 534-1, 525-1, 544-1, and 545-1 which are copies of documents 534, 535, 544, and 545, respectively. If link 540 is created without activating the notification attribute then documents 534, 535, 544 and 545 are copied to the persistent storage area of collector 513.

FIG. 5(*b*) illustrates using a roster to send information to multiple collectors. John creates forwarding link 570 to roster 522. Assuming document 515 is placed in the persistent storage area of collector 513 after the creation of forwarding link 570, forwarding link 570 forwards a copy of document 515 to roster 522. Since roster 522 contains link 550 to collector 532 and link 560 to collector 542, a copy of document 515 is placed in the new storage area of collector 532 and the new storage area of collector 542. Therefore, notifier section 530-2, which is associated with collector 532, displays document 515-1 which is a copy of document 515. Similarly, notifier section 540-2, which is associated with document 542, displays document 515-2 which is a copy of document 515.

Figure 6:
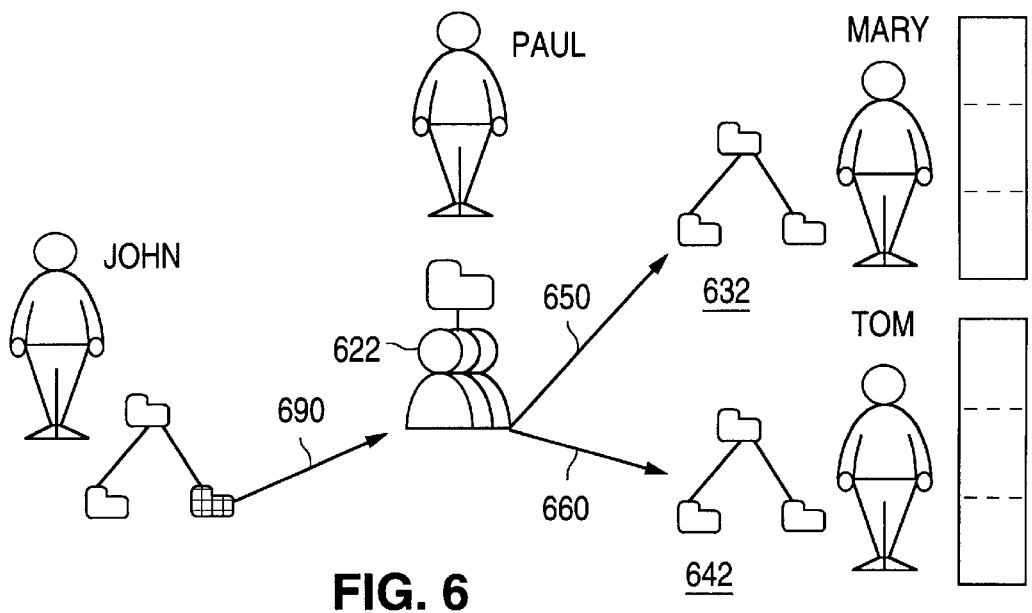
FIG. 6 shows the use of a roster for access control in accordance with one embodiment of the present invention.

A roster can also be used to provide authorization to a group of different collectors. As explained above a roster is a special type of collector which contains links to other collectors. A link to a roster is equivalent to a link with identical attributes to every collector linked in the roster. Therefore, an authorization link to a roster is equivalent to creating an authorization link to every collector linked in the roster. As illustrated by the cross hatching in FIG. 6, John has read protection on for collector 613. However John creates link 690 with read authorization to roster 622. Roster 622 contains link 650 to collector 632 and link 660 to collector 642. Therefore, authorization link 690 authorizes both Mary who owns collector 632 and Tom who owns collector 642 to read from collector 613. Other users without read authorization link are unable to read from collector 613. Similarly, if collector 613 had paste protection and link 690 had paste authorization, Mary and Tom would be able to paste into collector 613. Furthermore, post protection and post authorization are analogous to paste protection and paste authorization.

As explained above, the conventional communication and information management systems used with computer networks were developed independently and tailored for only specific tasks. Therefore the disparate communication and information systems do not function cooperatively to the benefit of the users. Furthermore, many conventional communication and information systems have limitations even for the tasks the systems were designed to perform. Embodiments of the present invention can be used to enhance or replace the disparate conventional systems to provide for the communication and information needs of the users.

FIG. 7(*a*) illustrates a conventional email system. Paul sends document 710 as an email message to John. Tom sends document 720 as an email message to John. John's email inbox 730 receives document 710-1 and document 720-1, which are copies of document 710 and document 720, respectively. John then must sort the documents in email inbox 730.

FIG. 7(*b*) illustrates an email system in accordance with one embodiment of the present invention. John can give the address, typically a URL, of his collectors to selected users. The URL of a collector can be used as the email address of the collector, so that a message sent to the address of the collector is received in the collector. For example John may be a professor who teaches two separate classes. John would likely wish to receive email messages for each class in a separate email inbox. In accordance with the present invention, John can use each of his collectors as a separate email inbox. For example, John can use collector 742 as an email inbox for one class and collector 744 as an email inbox for another class. John, would give the URL of collector 742 to students of the first class such as Paul. Students of the second class such as Tom would receive the URL of collector 744.

When Paul wishes to email document 754 as an email message to John, Paul would send document 754 to the address of collector 742. Specifically, in some embodiments of the present invention, Paul would post document 754 to collector 742 using a post command, which causes a copy of document 754 to be sent to the post input port of collector 742. John would then receive document 754-1, which is a copy of document 754, in the new storage area of collector 742. Furthermore, notifier section 740-2, which is associated with collector 742, would display document 754-1. Similarly, Tom sends document 764 as an email message to John by posting document 764 to collector 744. Document 764-1, which resides in the new storage area of collector 744, is then displayed in notifier section 740-4 to indicate the arrival of the new email messages to John.

John, could later decide that some problem students in his second class need special attention. John can then give the URL of collector 745 to those problem students. The problem students' email messages are sent to collector 745 and are displayed in notifier section 740-5 and are thus separated from the other students of John's second class. Therefore, John can give greater attention to those students' email messages without having to first sort through all his email messages to find the email messages from the problem students. Thus, like John, the recipient of email using an embodiment of the present invention can arrange to have his email come to his collectors presorted.

Furthermore, if there is a student in both of John's classes, that student can intelligently select to which of John's collectors to send email messages. Thus the sender of email messages using an embodiment of the present invention can sort his email in accordance with the collector arrangement of the recipient.

Another advantage of using an embodiment of the present invention over conventional email system is that the recipient of email can control who can send him email. In conventional systems any user on the network can send email to any other user's email inbox. In an embodiment of the present invention which uses collectors as email inboxes, the owner of the collector can activate the post and paste protection on his collectors and then create links to authorize only certain users to send documents to certain collectors. For example, John can create a roster of all the students in John's first class and create an authorization link to the roster so that only those students can access the collector reserved for the first class.

By using rosters, users of the present invention can also implement mailing lists. The maintainer of the mailing list can allow public access to a roster containing links to collectors of those users who wish to be on the mailing list. Any message posted to the roster is equivalent to posting the message to each of the collectors linked in the roster. Therefore, just as in conventional mailing lists, a user can simply send email to one location and have the system automatically forward the email to all users on the mailing list. In some embodiments of the invention, rosters can contain links to virtual users. Virtual users only have access to conventional email systems. Posting documents to a roster with virtual users results in virtual users receiving the document as a conventional email message.

To facilitate ease of use, in one embodiment of the present invention, a user is given the option to reply to an incoming document in his notifier. Using the reply option causes the reply to be posted to the information source collector of the incoming document. Thus, two users can exchange email by simply replying to the documents displayed in their notifier.

Figure 8A:
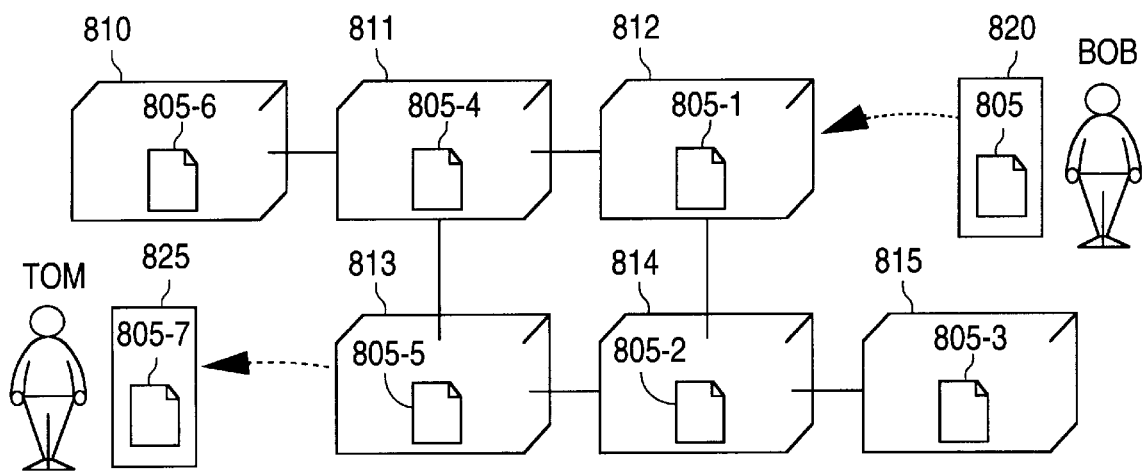
FIG. 8(a) shows a conceptual model of conventional electronic news system.
Figure 8B:
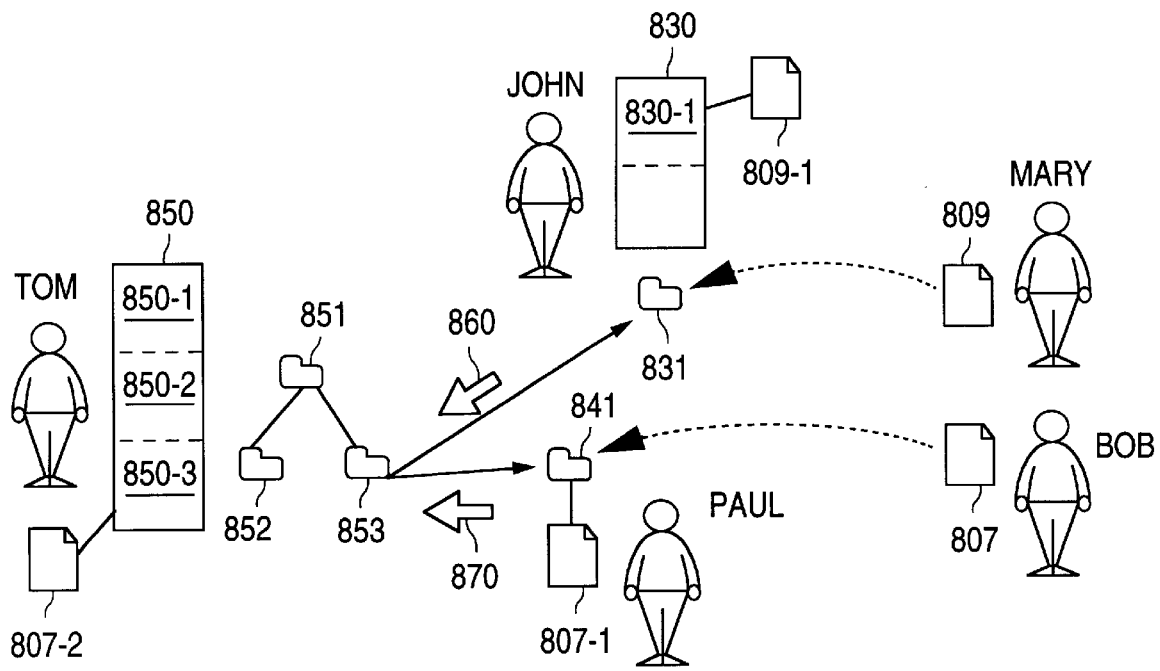
FIG. 8(b) shows a conceptual model of an electronic news system in accordance with one embodiment of the present invention.

FIG. 8(*a*) illustrates a conventional newsgroup system. Bob, uses his news reader 820 to send article 805 to Bob's local news server 812. Bob's local news server 812 keeps a copy of article 805 for local users and forwards copies of article 805 to news servers across the world such as news server 810, 811, 813, 814, and 815. Each of the news servers keep a copy of article 805. Tom reads news using news reader 825. News reader 825 obtains article 805-7, which is a copy of article 805, from Tom's local news server 813.

FIG. 8(*b*) illustrates a new newsgroup system using an embodiment of the present invention. In the new newsgroup system, collectors replace traditional newsgroups. For example, in FIG. 8(*b*), Paul can create a newsgroup by allowing paste and read permission on collector 841. Thus Bob, who wishes to send article 807 to a "newsgroup" would paste article 807 to collector 841. Article 807-1, which is a copy of article 807, is stored in the persistent storage area of collector 841. Users who wish to read the "newsgroup" would create subscription links to collector 841 to subscribe to new articles out of collector 841. For example, Tom has created link 870 from collector 853 to collector 841 with the notification and the subscription attributes activated. All new articles pasted into collector 841 are copied to the new storage area of collector 853 and displayed in notifier section 850-3. Thus article 807-2, which is a copy of article 807, is displayed in notifier section 850-3.

John has created a moderated "newsgroup" with collector 831. Collector 831 has post permission and read permission granted to all users. Thus Mary can post article 809 to collector 831. Article 809-1, a copy of article 809, is stored in the new storage area of collector 831 and is displayed for John's review in notifier section 830-1. If John accepts article 809-1, article 809-1 is moved to the persistent storage area of collector 831, where subscribers to collector 831, such as Tom, can read article 809-1. Tom subscribed to collector 831 by creating link 860 from collector 853 to collector 831. Like link 870, link 860 has the attributes to subscribe with notification from collector 831. However until John, the moderator, accepts document 809-1, Tom does not receive a copy of article 809.

Thus the functionalities of newsgroups can be supplanted by the use of collectors. Furthermore the use of collectors provides several additional benefits. As evidenced by notifier section 850-3, a user who subscribes to a collector based newsgroup can receive notification of new articles in a unified notifier. However, the user can choose not to receive notification and instead just receive copies of the articles.

Another benefit is that users can subscribe to multiple collector newsgroups from different collectors. For example, Tom may have used collector 853 to receive articles from both collector 841 and collector 831 because the collector 841 and collector 831 are on related topics. Tom could use collector 852 to subscribe to another collector newsgroup on a different topic. Thus a user can receive the news articles presorted into different collectors.

Another benefit of implementing newsgroups as collectors is that creating new newsgroups is vastly simplified. In conventional systems, newsgroups must replicated across all of the news servers to guarantee global access. In an embodiment of the present invention, any user can create a new newsgroup simply by creating a collector which allows other users to read from and paste or post into the collector. Similarly removal of newsgroups is also simplified since the user who owns the collector newsgroup can simply restrict access to the collector. Another advantage of the a newsgroup system in accordance with one embodiment of the invention is that the user who owns the collector acting as a newsgroup can use a negative authorization link to prevent abusive users from accessing and pasting to the collector.

Some embodiments of the present invention enhance the use of WWW browsers. One advantage is that instead of having a single bookmark file, users of a system in accordance with the present invention can use each of the user's collector as a bookmark file. Thus a user exploring the WWW can easily save the link to an interesting web page in any of his collectors.

Figure 9:
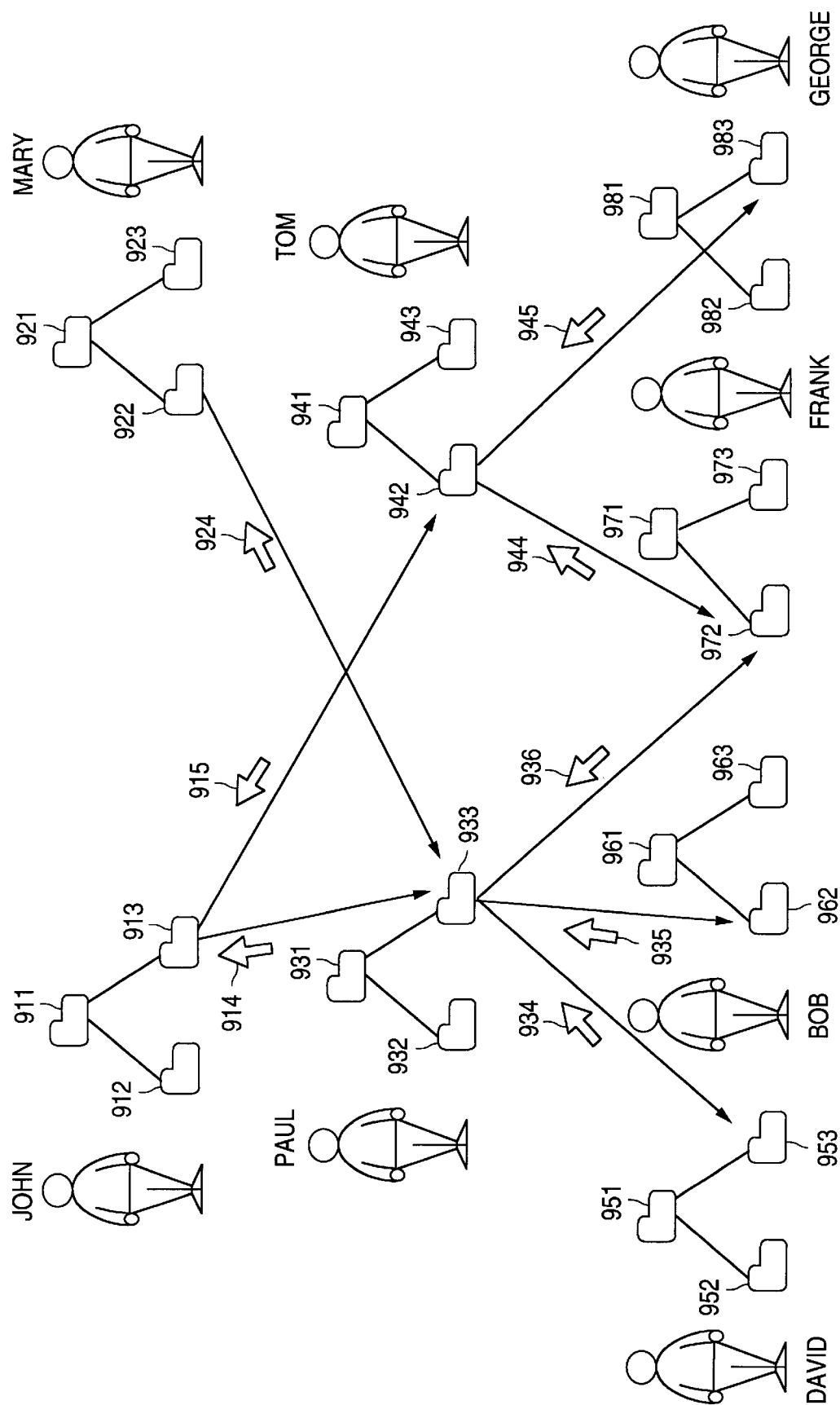
FIG. 9 shows a conceptual model of an information gathering system in accordance with one embodiment of the present invention.

Information systems in accordance with the present invention are also capable implementing novel methods of information gathering and filtering. FIG. 9 illustrates a method and system of information gathering using an embodiment of the present invention. In FIG. 9, John, Mary, Paul, David, Bob, Frank, and George share a common interest in a certain broad topic, for example financial investing. David collects information on a first sub-topic, for example high tech stocks, in collector 953 by using collector 953 as a newsgroup (as described above). Bob personally collects articles on the first sub-topic, i. e. high tech stocks, by browsing the WWW and storing the articles in collector 962. Frank collects information from a variety of sources on a second sub-topic, for example interest rates, in collector 972. George uses collector 983 as a collector newsgroup on a third sub-topic, for example bonds.

Paul is only interested in certain sub-topics, for example stocks. Paul can take advantage of the work of David, Bob, and Frank by simply creating subscription links to collector 953, collector 962, and collector 972. Specifically, Paul creates link 934 from collector 933 to collector 953 with attributes to subscribe to information with notification. Paul also creates link 935 from collector 933 to collector 962 and link 936 from collector 933 to collector 972. Link 935 and link 936 also have attributes to subscribe to information with notification. Thus, Paul will receive a copy of all new articles placed in collector 953, collector 962, and collector 972, in the new storage area of collector 933. Paul can review the new article in the notifier section associated with collector 933. As Paul reviews the documents, Paul accepts only those document which he considers most pertinent. The accepted documents are then moved to the persistent storage area of collector 933.

Tom is interested in different sub-topics than Paul. For Example, if Tom is only interested in bonds, Tom can use the information collected by George in collector 983 and the information collected by Frank in collector 972. Tom would then create link 944 from collector 942 to collector 972 to subscribe to information with notification from collector 972. Tom would also create link 945 from collector 942 to collector 983 to subscribe to information with notification from collector 983. Once link 944 and link 945 are created, new articles in collectors 972 and 983 are copied to the new storage area of collector 942 and displayed in the notifier section associated with collector 942.

Mary, who is only interested in stocks but does not wish to wade through too much information, can take advantage of the information gathering and filtering already performed by Paul. Mary need only create link 924 from collector 922 to collector 933 to obtain a copy of every article that Paul has added to the persistent storage area of collector 933. Link 924 would most likely be created to subscribe to information with notification. However, Mary could also subscribe to information without notification.

John is interested in both stocks and bonds. Therefore, John would like to take advantage of the information gathering and filtering performed by both Paul and Tom. John can create link 914 from collector 913 to collector 933 to subscribe to information with notification from collector 933. Similarly, John can create link 915 from collector 913 to collector 942 to subscribe to information with notification from collector 942. Thus, John receives all the articles placed in the persistent storage areas of collector 933 or collector 942.

In the preceding example, it is assumed that the links to the various collectors are authorized. For example, John can receive information over link 914 if Paul has read protection set on collector 933 without a read authorization link from collector 935 to one of John's collectors.

If Mary would prefer to receive the information without filtering by Paul, Mary would have to create her own links to collector 953, collector 962 and collector 972. Alternatively, if Mary is Paul's superior she could order Paul to either accept all of the information from the new storage area of collector 933 or convert link 934, link 935 and link 936 to be without notification. Any change to collector 933 by Paul to satisfy Mary would of course change the results reaching John.

In some embodiments of the present invention, the destination of other user's links can be obtained. For example in these embodiments, Mary can discover the link destination collectors of any link with collector 933 as the link's link source collector. This feature allows Mary to discover other collectors which she may wish to review. In some embodiments, this feature can be selectively disabled by the user who owns the link source collector. This feature is implemented by some embodiments by the system, which automatically creates a roster with links to all collectors to which the current collector is linked. Furthermore, some embodiments create separate rosters for forwarding links and subscription links.

Figure 10:
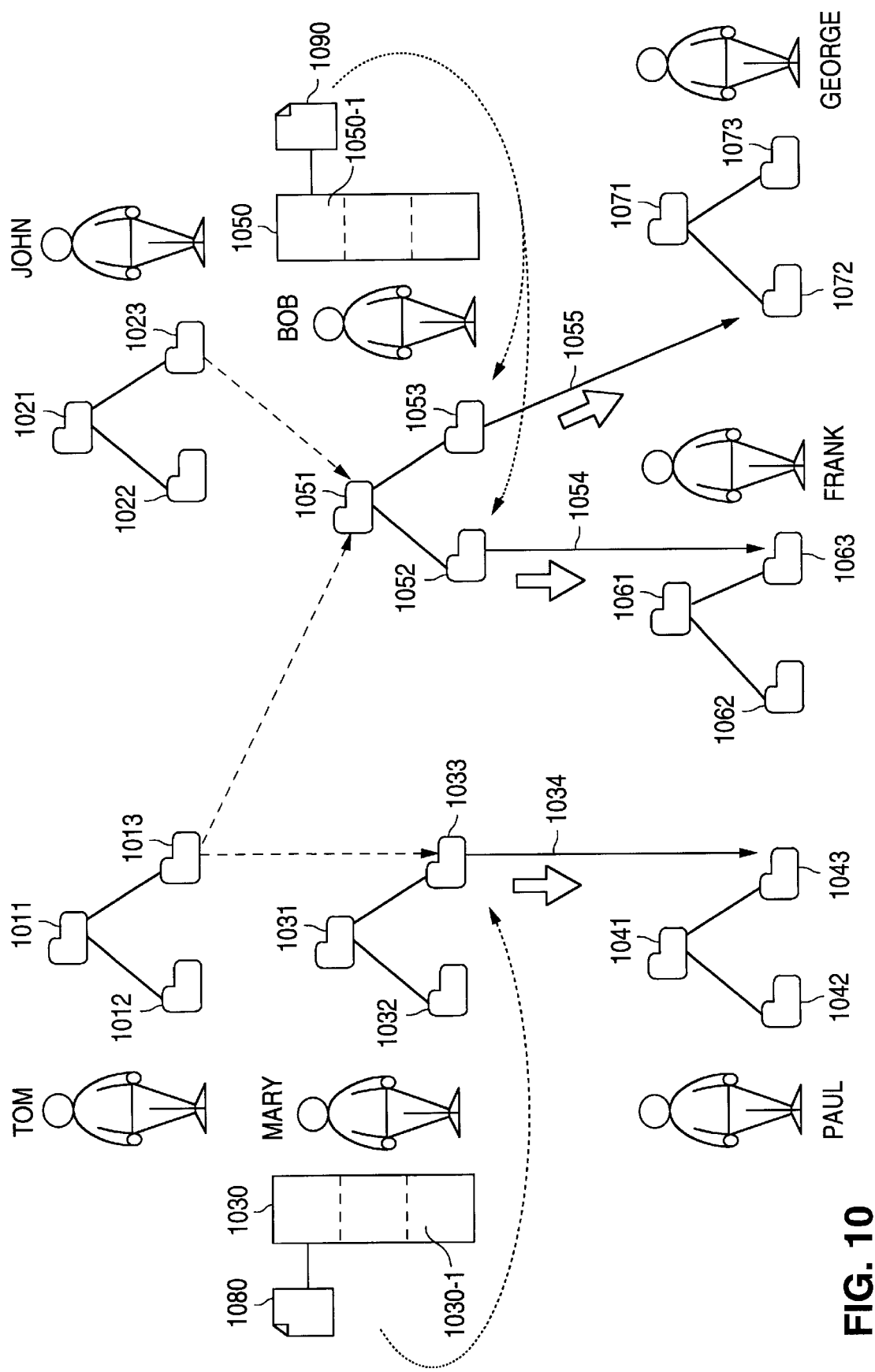
FIG. 10 shows a conceptual model of an information routing system in accordance with one embodiment of the present invention.

Embodiments of the present invention can also be used to implement novel information routing systems. FIG. 10 illustrates an example of a novel information routing system. Tom collects information in collector 1013. Tom can selectively send information in collector 1013 to the new storage area of collector 1033 by posting the documents to collector 1033. Mary views the information from collector 1013, for example document 1080, in notifier section 1030-3, which is associated with collector 1033. If Mary accepts document 1080, document 1080 is moved to the persistent storage area of collector 1033. A copy of document 1080 is then forwarded by link 1034 to Paul's collector 1043.

Tom can also post documents to the new storage area of Bob's collector 1051. Documents, such as document 1090, posted into the new storage area of collector 1051 are displayed in notifier section 1050-1, which is associated with collector 1051. Bob, then reviews the incoming documents to determine whether to discard, accept, or forward the documents.

Bob, can also receive documents from other users, such as John, by not activating the post protection attribute or paste protection attribute on collector 1051 or specifically authorizing other user's to post or paste into collector 1051.

If Bob wishes to forward a copy of document 1090 to Frank, Bob need only place a copy of document 1090 into collector 1052, which is linked to collector 1063 by link 1054. Link 1054 is set to forward information with notification from collector 1052 to collector 1063. Therefore, any documents placed in collector 1052 will automatically be copied and posted to collector 1063.

Similarly, if Bob wishes to forward a copy of document 1090 to George, Bob need only place a copy of document 1090 into collector 1053, which is linked to collector 1072 by link 1055. Link 1055 is set to forward information with notification from collector 1053 to collector 1072. Therefore, any documents placed in collector 1053 will automatically be copied and posted to collector 1072.

For further clarification, a concrete example using the information routing system of FIG. 10 in a corporate setting is provided as follows. In this example, John is an office assistant who sorts incoming mail. Mary is a member of the human resources department for the software department. Bob is a member of the human resources department for the hardware department. Paul heads a software project at the corporation that is understaffed. Frank and George are heads of separate hardware projects, which are both understaffed. The corporation has advertised for positions in both the hardware and software departments. When resumes are received, Tom digitizes the resumes and places the digitized resumes in collector 1013. Tom posts copies of the resumes of hardware engineers to Bob's collector 1051. Tom then posts the copies of the resumes of software engineers to Mary's collector 1031.

Bob has also advertised for resumes in electronic form for the hardware positions. Bob provides the URL of collector 1051 in the advertisement and allows global posting into collector 1051. Thus, John, a hardware engineer seeking employment, is able to send an electronic copy of his resume directly to collector 1051. If the resume does not satisfy Paul's criteria, Mary can discard or store the resumes in another collector for future reference.

Mary receives all the resumes for software engineers in collector 1033. Mary then reviews the resumes to decide which satisfy the criteria for the software positions. Those that are satisfactory are accepted into the persistent storage area of collector 1033 and automatically forwarded to Paul's collector 1043 via link 1034. Paul can then review the resumes to determine which candidates to interview.

Similarly, Bob receives all the resumes for hardware engineers in collector 1051. However, Bob is searching for candidates for Frank and George. Therefore, the resumes of candidates satisfying Frank's criteria are transferred to the persistent storage area of collector 1052 and automatically forwarded to Frank's collector 1063 via link 1054. The resumes of candidates satisfying George's criteria are transferred to the persistent storage area of collector 1053 and automatically forwarded to George's collector 1072. If a candidate satisfies both sets of criteria the candidate's resume can be copied to both collector 1052 and collector 1053. The resumes of candidates that do not satisfy criteria of either Frank or George can be discarded or kept in another collector for future reference.

Thus, George and Frank receive only those resumes which satisfy their individual criteria. Each of them can then review the resumes they received to determine which candidates to interview.

The information routing system of FIG. 10 can of course be expanded to include other users and to use links having different attributes activated. A primary advantage of an information routing system in accordance with the present invention is the ease that such a system can be adjusted to changing conditions. In particular, each user can adjust the system to take care his or her own particular needs without unduly burdening other users or a system administrator. For example, if Mary goes on vacation she can simply have Tom change link 1014 to paste information into collector 1033 instead of posting the information. Alternatively, in some embodiments, Mary can set an "accept all" attribute so that all incoming documents to the new storage area of collector 1033 are automatically accepted into the persistent storage area of collector 1033. If a user is available to sub for Mary during Mary's vacation, Mary can cancel link 1034, create a link to the substitute's collector, and have the substitute create a link to collector 1034. In this way, Paul and Tom would not be impacted in any way by Mary's vacation. As another example, if Paul decides to get the opinion of another user on the resumes, he can simply create a link to a collector of the other user so that the resumes Paul accepts are forwarded to the other user.

The system of FIG. 10, can also make use of rosters in any situation where multiple people would receive the same information. For example if there are several software projects which have similar staffing needs, Mary could create a roster containing links to collectors of each of the project heads. Then, Mary can simply create a link to the roster to forward information to all the project heads. As the staffing needs change for each project, Mary need only edit the roster to remove project heads rather then change links.

Embodiments of the present invention can also implement novel systems to enhance the interaction between information providers and information subscribers. Information providers typically separate their information hierarchically in what can be termed an information map. Using a system in accordance with the present invention, information providers can use a hierarchical arrangement of collectors. For example, referring to FIG. 11, root collector 1110, that represents a single broad category, contains collector 1111 and collector 1112. Collector 1111 and collector 1112 each represent a narrower sub-topic within the broad topic of collector 1110. The sub-topic of collector 1111 is again divided by collector 1115 and collector 1116. Actual documents and links to documents are contained in collector 1115 and collector 1116. Similarly, the sub-topic of collector 1112 is divided into collector 1117 and collector 1118. Actual documents and links to documents are contained in collector 1117 and collector 1118.

Figure 11:
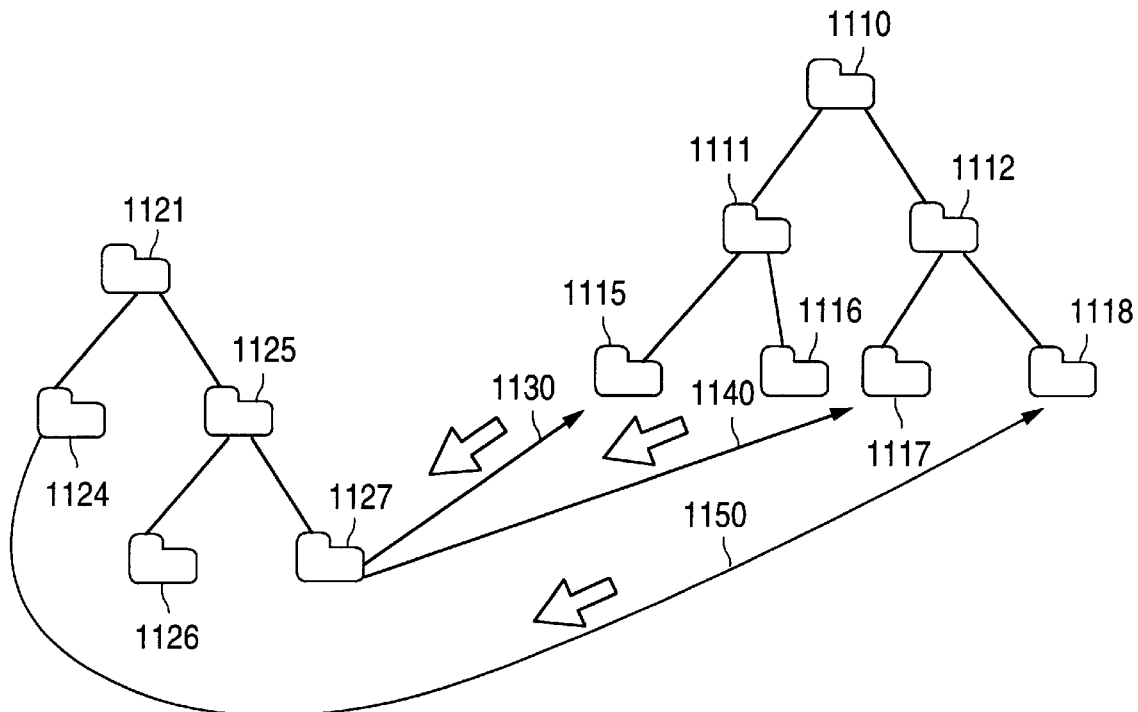
FIG. 11 shows a conceptual model of an knowledge remapping system in accordance with one embodiment of the present invention.

An information subscriber, i. e. a user who obtains information from the information provider, may wish to lay out the information in a different hierarchy. Using the principles of the present invention, a user can easily rearrange the information map provided by the information subscriber into an information map of the user's own choosing. As shown in FIG. 11, a user's information map can comprise root collector 1121, containing collector 1124 and collector 1125. Collector 1125 contains collector 1126 and collector 1127. In the user's information map the sub-topics covered in collector 1115 and 1117 are combined in collector 1127. Therefore, the user can create link 1130 from collector 1127 to collector 1115 to subscribe to information from collector 1115. The user would also create link 1140 from collector 1127 to collector 1117 to subscribe to information from collector 1117. Collector 1124 of the information subscriber's information map corresponds to collector 1118 of the information provider's information map. Therefore, the information subscriber creates link 1150 from collector 1124 to collector 1118 to subscribe to information from collector 1118. If the information subscriber wishes to be notified of new documents he would activate the notification attribute on the various links. Thus the information subscriber is able to easily remap the information provider's information map into the information subscriber's information map.

Systems in accordance with the present invention can also be used organize human resources, i.e. users. As mentioned above, rosters contain links to users' collectors. A link from a first collector to a roster is equivalent to creating separate links, with identical attributes as the link, from the first collector to all the collectors linked in the roster. Furthermore, posting or pasting a message to a roster is equivalent to posting or pasting copies of the message to every collector linked in the roster.

Rosters can also contain links to other rosters. For example in FIG. 12, roster 1294 contains link 1297 to roster 1282. A link to a first roster containing a second roster is equivalent to a link to all the collectors linked in the first roster as well as the collectors linked in the second roster. Therefore, a link to roster 1294 is equivalent to separate links to collector 1252, collector 1262, collector 1272, and collector 1283.

Any user can create a roster to his own liking. For example a software project manager such as Mary in FIG. 12 can use rosters to organize her human resources. Mary can create roster 1291 to contain links to her quality assurance engineers, such as Tom and George. Roster 1294 can contain links to her developers such as Bob and Paul. Roster 1294 also contains link 1297 to roster 1282. Roster 1282 is maintained by Sam who could be a senior programmer leading a group to develop a sub project. Sam maintains roster 1282 to organize his human resources, which include Sam and Frank. Mary can take advantage of Sam's work in creating roster 1282 by simply creating a link to roster 1282.

To represent all of Mary's human resources she creates roster 1212 which contains link 1215 to roster 1291 which contains link 1214 to roster 1291, link 1216 to roster 1294, as well as links to Mary's collector 1213 and John's collector 1222. John can be for example Mary's supervisor or perhaps a consultant to the project.

Figure 12:
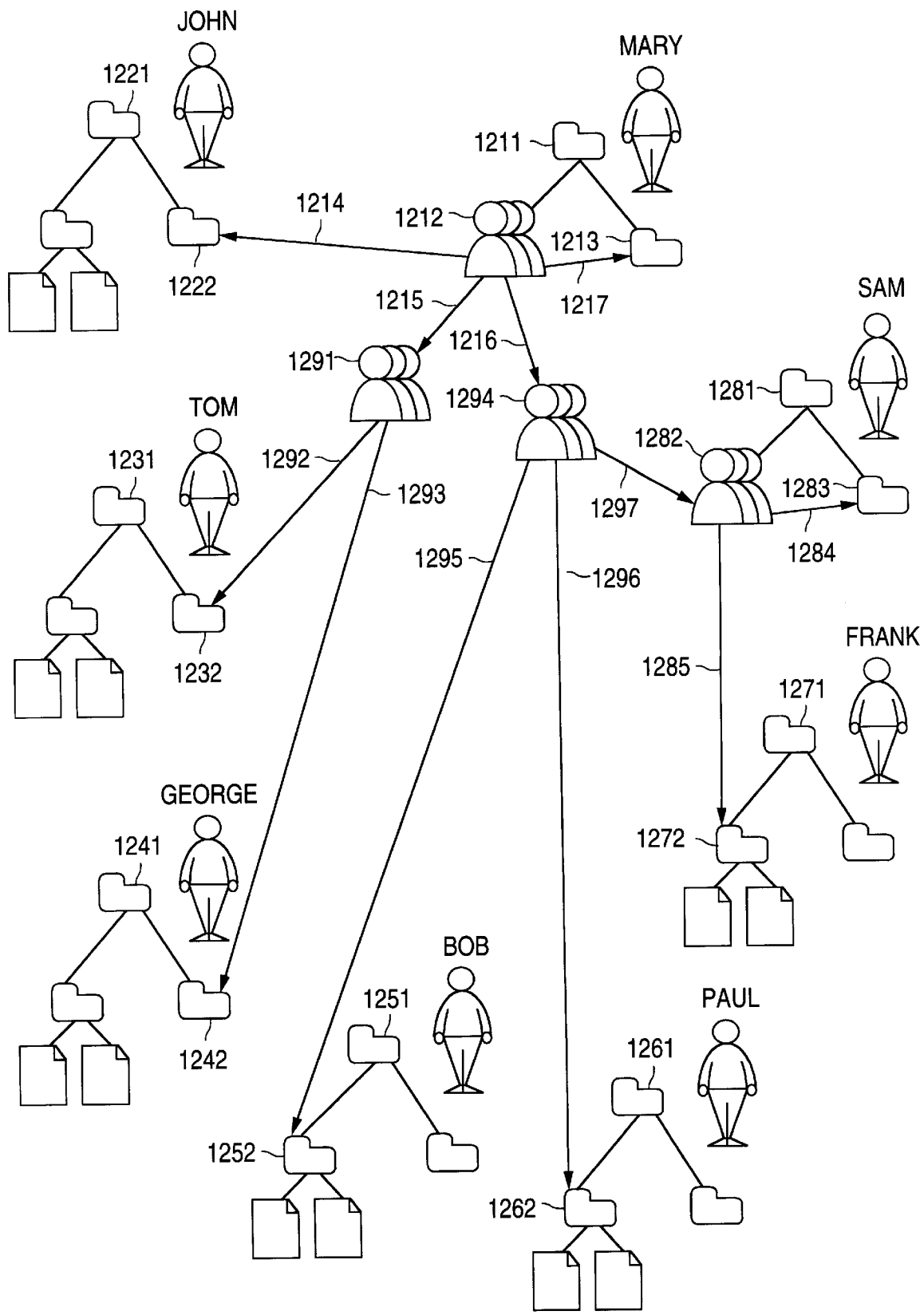
FIG. 12 shows the use of rosters for organizing human resources in accordance with one embodiment of the present invention.

As shown in FIG. 12, rosters in accordance with the present invention can be used to describe hierarchy of human groups. Furthermore, as explained above rosters also have several functional uses in addition to organizing human resources. For example, Mary can use roster 1291 to authorize only her quality assurance engineers access to a certain version of the code of her project. Mary can use roster 1294 to post important messages to all her developers.

Figure 13A:
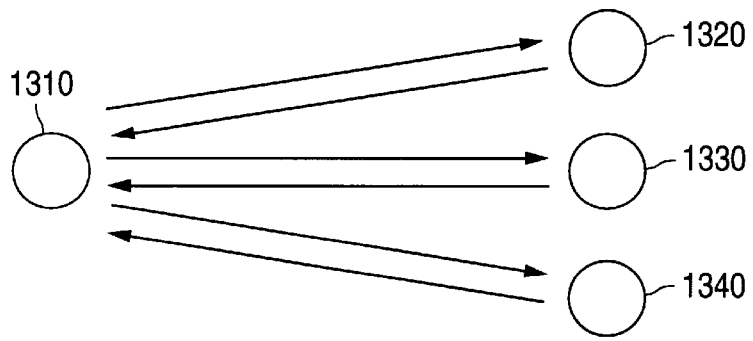
FIG. 13(a) shows the implementation of a conventional information system.
Figure 13B:
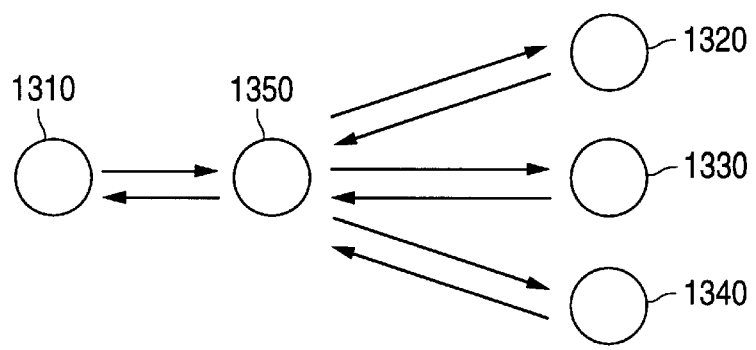
FIG. 13(b) shows a implementation of an information system in accordance with one embodiment of the present invention.

FIG. 13(b), shows the implementation of one embodiment of the present invention. The embodiment of FIG. 13(b) is created by using enhancements to conventional WWW technology. FIG. 13(a) shows the typical way web browsers and web servers are used. Web browser 1310 communicates directly with web server 1320 using HTTP. Furthermore, most web browsers support communication with other systems such as File transfer protocol (FTP) server 1330 and communication with other conventional document servers represented by document server 1340.

In the embodiment of FIG. 13(b), proxy server 1350 is used with web browser 1310, which can be for example Netscape Navigator. Web browser 1310 communicates with proxy server 1350 which then communicates with web server 1320, FTP Server 1330, or document server 1340.

Specifically, proxy server 1350 intercepts requests from web browser 1310 according to the HTTP proxy standard. Proxy server 1350 adds a menu bar, for activating commands in accordance to the present invention, to documents retrieved by web browser 1310. If web browser 1310 generates commands or requests directed at proxy server 1350 by using the menu bar inserted by proxy server 1350, proxy server 1350 generates replies to the commands or requests in accordance to the principles of the invention. An implementation of proxy server 1350 using PERL Scripts for running on a Unix CERN HTTP proxy server is included in appendix A.

To use a system in accordance with the present invention, a user must be registered with a user account. Table 1 provides pseudo code for the operations for the registration of an user account in accordance with one embodiment of the present invention. As used in the pseudo code herein, braces { } surround comments and names given to specific links, documents, collectors, or rosters. Bold characters are used for program names, subroutine names, and operations. Program names in parenthesis ( ) are calls to activate the program. Subroutine names in brackets [ ] are calls to activate the subroutine. Subroutine names in bolded brackets [ ] mark the start of the subroutine definitions. Code lines, which cross physical page lines, are indented two characters on subsequent lines. Code lines, which are on a lower hierarchical level are indented four characters from the previous code line.

TABLE 1

Pseudo code to register a new user
REGUSER: Register a new user.
  create a collector whose name is the new

TABLE 1-continued

```
user's name {root collector}
    {create a unix directory that will serve
        as the user's root collector and make it
        available as a Web page}
    create a notifier
    create a notifier section associated with the
        root collector
    create a clipboard
        {create a unix directory that will be used
            as the user's clipboard}
```

Figure 14A:
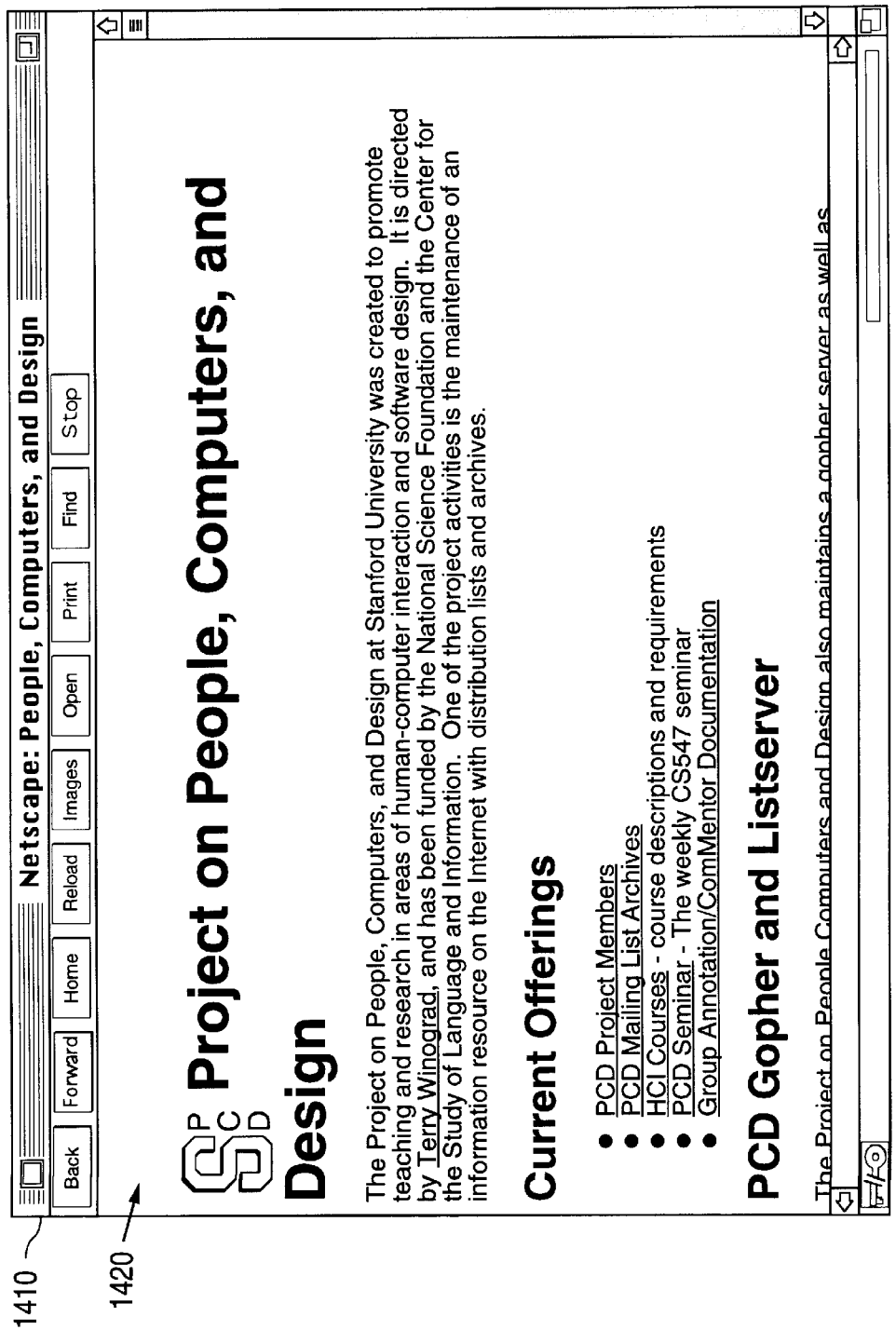
FIG. 14(a) shows a document (web page) used conventionally.
Figure 14B:
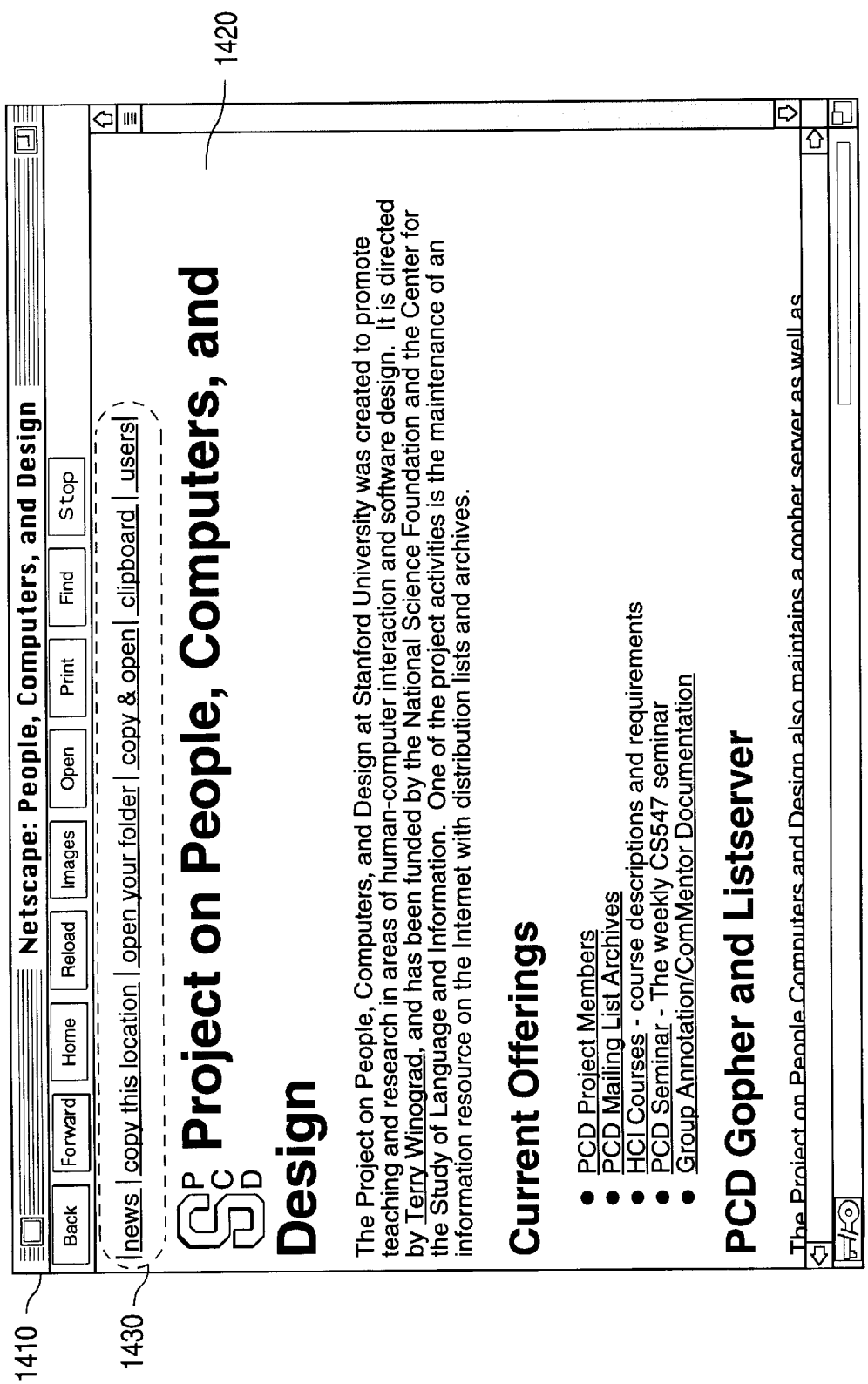
FIG. 14(b) shows a document (web page) used in accordance to one embodiment of the invention.

FIG. 14(a) shows the display window 1410 of Netscape Navigator, which is a web browser. A document, in this case a web page from Stanford, is displayed in subwindow 1420 of display window 1410. FIG. 14(b) shows the same display window 1410 with the same document retrieved through proxy server 1350, which has added menubar 1430 to the web page from Stanford. As far as the web browser is concerned menubar 1430 is simply part of the document, which the browser tried to retrieve.

Table 2 and Table 3 provides the pseudo code to open and display a document in accordance with one embodiment of the present invention.

TABLE 2

```
Pseudo code to open a document
OPENDCMT: Open a document {document1}
    if the collector {collector1} containing
        document1 is read protected
    then
        if the user is the owner of collector1
        then display document1 (DISPDCMT
            document1)
        else
            if collector1's persistent storage
                area contains a link {link1} to a
                collector {collector2 }
            and collector2 belongs to the user
            and link1 is marked read authorized or
                write authorized
            then display document1 (DISPDCMT
                document1)
            else
                if collector1's persistent storage
                    area contains a link {link2} to
                    a roster {roster1}
                and roster1 contains a link
                    {link3} to a collector
                    {collector3}
                and collector3 belongs to the user
                and link2 is marked read
                    authorized or write authorized
                then display document1 (DISPDCMT
                    document1)
                else error message
    else display document1 (DISPDCMT document1)
```

TABLE 3

```
Pseudo code to display a document
DISPDCMT: Display a document {document1}
    display menu {news, copy this location, open
    your folder, copy & open, clipboard, users}
    display document1
```

Menubar 1430 presents the user with various commands to manipulate the user's collectors and objects. Each command on menubar 1430 represents an HTTP link to proxy server 1350. The "news" command causes the user's notifier to be retrieved and displayed. The "copy this location" command stores the URL of the currently displayed document in the user's clipboard. The "open your folder" command retrieves and displays the user's root collector. The command "copy & open" is a compound command to copy the URL of the displayed document and to retrieve and display the user's root collector. The command "clipboard" displays the user's clipboard, which in most embodiments can contain multiple items. The command "users" retrieves and displays the system roster containing a link to a collector of each user of the system.

Table 4 provides pseudo code for the general options for a system in accordance with one embodiment of the present invention.

TABLE 4

```
Pseudo code to execute general options
EXEGEN: Execute general options
    switch
        case 'news' menu option pressed
            open notifier (OPENNOTI)
        case 'copy this location' menu option pressed
            delete all items in the clipboard
            copy the URL of the currently displayed
                item to the clipboard
        case 'open your folder' menu option pressed
            open root collector (OPENCLTR root
                collector)
        case 'copy & open' menu item pressed
            delete all items in the clipboard
            copy the URL of the currently displayed
                item to the clipboard
            open root collector (OPENCLTR root
                collector)
        case 'clipboard' menu option pressed
            display menu {news, open your folder,
                users}
            display clipboard
        case 'users' menu option pressed
            open system roster (OPENROSTER system
                roster)
        case double click on a document {document1}
            open document1 (OPENDCMT document1)
        case double click on a collector {collector1}
            open collector1 (OPENCLTR collector1)
        case double click on a roster {roster1}
            open roster1 (OPENROSTER roster1)
        case double click on a link {linkl}
            if link1 is to a collector {collector2}
                open collector2 (OPENCLTR collector2)
            ELSEIF link1 is to a roster {roster2}
                open roster2 (OPENROSTER roster2)
            ELSEIF link1 is to a document {document1}
                open document1 (OPENDCMT document1)
```

Figure 15:
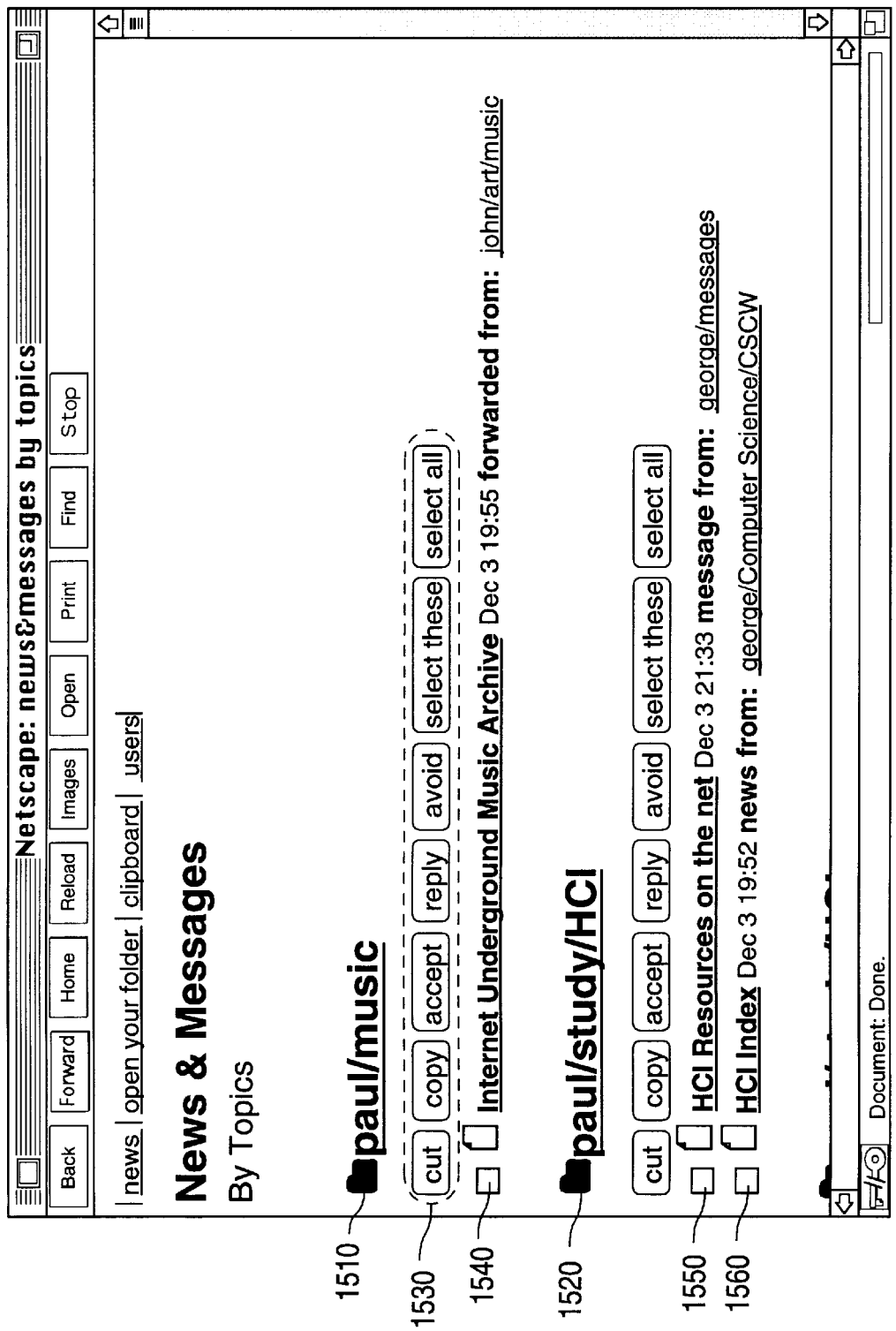
FIG. 15 shows a notifier display in accordance with one embodiment of the present invention.

FIG. 15 shows Paul's notifier according to one embodiment of the invention. When viewing Paul's notifier, menu bar 1530 differs from menu bar 1430 (FIG. 14(b)) since there is no need for the deleted commands. Specifically, the "news" command is deleted since Paul's notifier is already open. The "copy this location" command is deleted since there is not a need to copy the location of Paul's notifier. Similarly, the "copy & open" is also not necessary. The notifier sections associated with each of Paul's collectors which have received documents in the new storage area are displayed, such as notifier section 1510 labeled "paul/music" and notifier section 1520 labeled "paul/study/HCI". Each new document is summarized with a title, the address of the document's origin, as well as the method used to transfer the document. In the embodiment shown in FIG. 15, "forwarded from" implies that the document was transferred on a link which forwards the document to Paul, "news from" implies that the document was received through a subscription link into Paul's collector, and "message from" implies the document was posted into Paul's collector.

Table 5 provides the pseudo code to open and display the notifier in accordance with one embodiment of the present invention.

TABLE 5

Pseudo code to open and display the notifier
OPENNOTI: Open the notifier
    display menu {news, open your folder,
      clipboard, users}
    for each collector that belongs to the user
      display the collector name
      display the items in the new storage area
      of the collector In the embodiment of FIG. 15, a set of buttons is placed in each notifier section to allow a user to manipulate the documents displayed in that notifier section. The "cut" button moves the selected document into the clipboard so that the selected document is removed from the new storage area of the associated collector. The "copy" button copies the selected document into the clipboard while leaving original document in the new storage area of the associated collector. The "accept" buttons causes the document to be moved from the new storage area of the associated collector into the persistent storage area of the associated collector. The "avoid" button moves the selected documents into a special collector so that those documents will not appear in the notifier. The "select these" button selects all documents displayed in the notifier section. The "select all" button selects all documents in the notifier. Individual documents can be selected by well known point and click methods. Specifically, in the embodiment of FIG. 15, selection boxes 1540, 1550, and 1560 are clicked on to select the item adjacent the selection boxes. Although buttons are used in this embodiment, other methods of providing commands may be preferable.

Table 6 provides the pseudo code to execute the buttons on the notifier in accordance with one embodiment of the present invention.

TABLE 6

Figure 16:
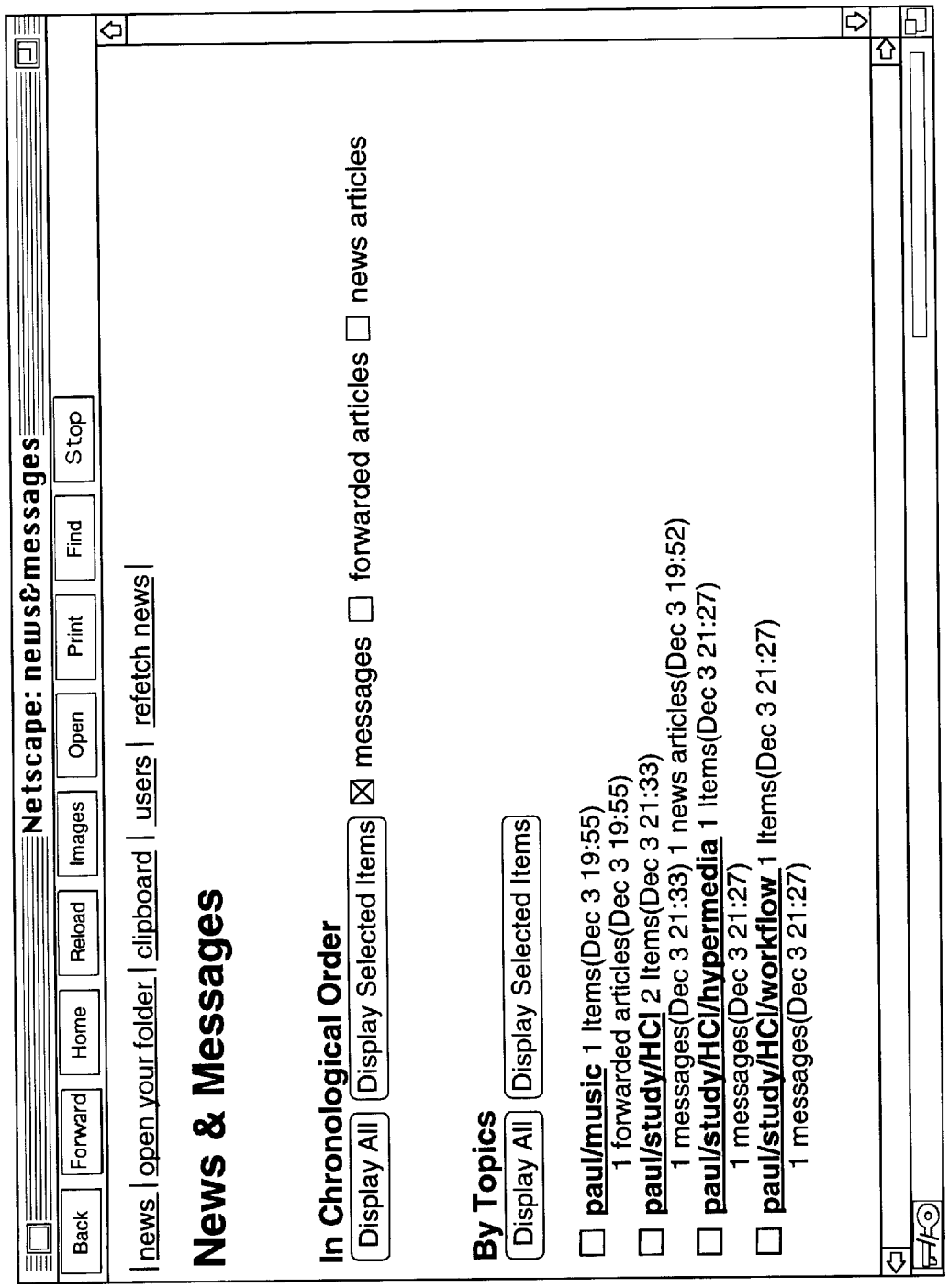
FIG. 16 shows a notifier summary display in accordance with one embodiment of the present invention.

Pseudo code to execute buttons on notifier
EXENOTI: Execute buttons on the notifier
  switch
    case an item's checkbox is checked
      make the item's state 'selected'
    case 'cut' button pressed
      delete all items in the clipboard
      move selected items from the new storage
        area of the collector which contains the
        items to the clipboard
    case 'copy' button pressed
      delete all items in the clipboard
      copy selected items from the new storage
        area of the collector which contains the
        items to the clipboard
    case 'accept' button pressed
      move selected items from the new storage
        area of the collector which contains the
        items to the persistent storage area of
        the same collector
    case 'reply' button pressed
      execute an editor application for the user
        to create a document
      post the document to the origination point
        of the selected item
    case 'avoid' pressed
      move selected items from the new storage
        area of the collector to the persistent
        storage area of an avoid collector
    case 'select these' button pressed TABLE 6-continued mark all items in the notifier section as
        selected
    case 'select all' button pressed
      mark all items in the notifier as selected FIG. 16, shows a summary of the notifier of FIG. 15. The summary option is available in some embodiments of the present invention but is not necessary to the present invention.

Figure 17:
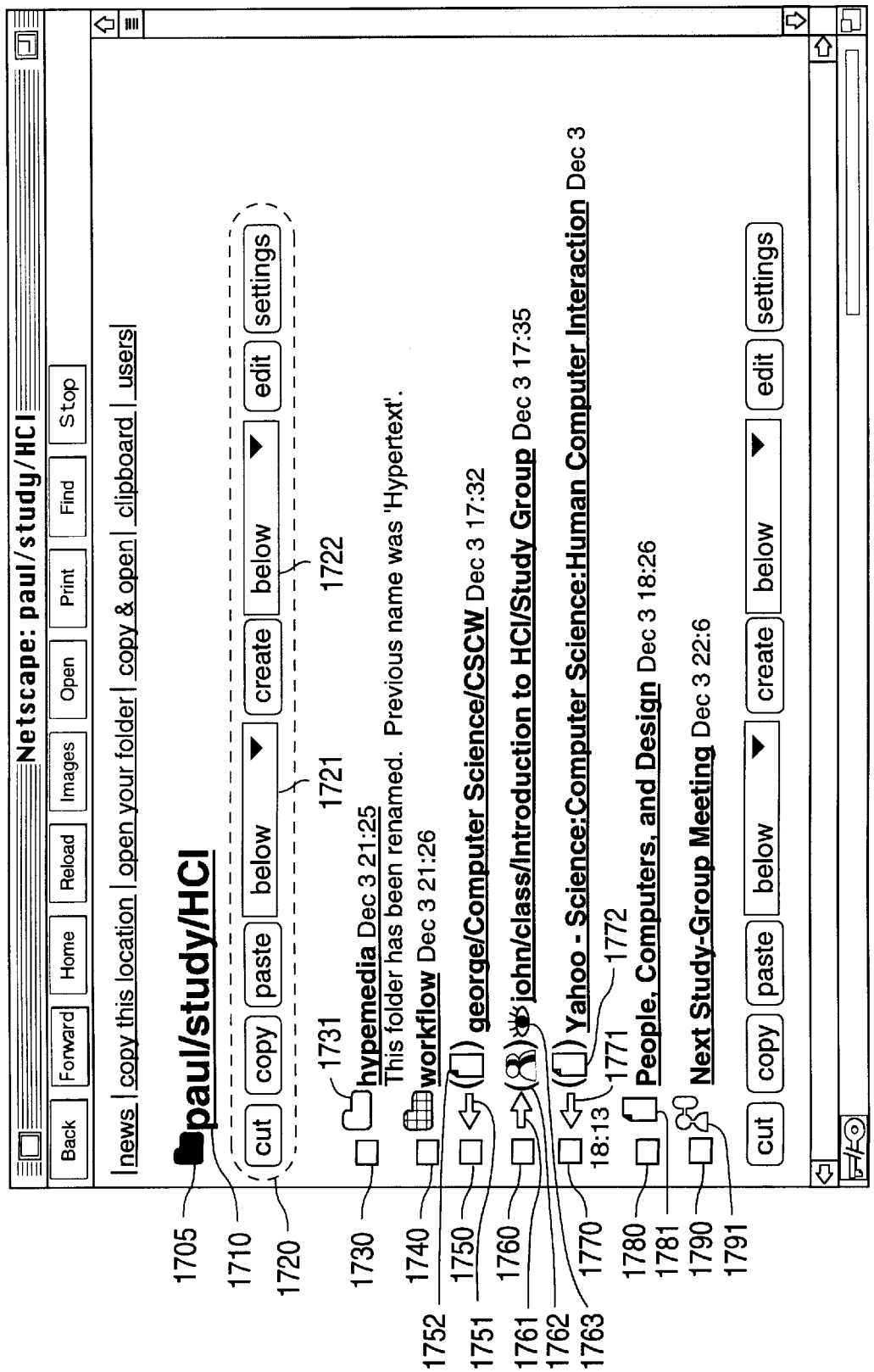
FIG. 17 shows a collector display in accordance with one embodiment of the present invention.

FIG. 17, shows one of Paul's collectors labeled paul/study/HCI which is part of the URL of the collector. The contents of the collector are displayed with iconic representation of their type and attributes. Entry 1730 is a collector which is not read or write protected as illustrated by clear folder icon 1731. In this embodiment, separate post and paste protection have been combined into a single write protection. Also in this embodiment, read protection implies write protection as well. Similarly write authorization implies read authorization. As explained above other embodiments have completely independent read, paste, and post protection as well as independent read, paste and post authorization.

Entry 1740 is a read and write protected collector as illustrated by hatchmarked folder icon 1741. Entry 1750 is a link to a collector, as illustrated by bracketed folder icon 1752, with the subscription attribute activated, as illustrated by subscription arrow icon 1751. Entry 1760 is a link to a roster, as illustrated by bracketed roster icon 1762, with the information forward attribute and the read authorization attribute activated, as illustrated by forward arrow icon 1761 and read authorization icon 1763, respectively. Entry 1770 is a link to an external document, as illustrated by external document icon 1772, with the subscription attribute set, as illustrated by subscription arrow icon 1771. Entry 1780 is a link to an external document, as illustrated by external document icon 1781 with no attributes set. Entry 1790 is a document, as illustrated by document icon 1791, residing in Paul's collector.

Table 7 and Table 8 provides the pseudo code to open and display a collector in accordance with one embodiment of the present invention.

TABLE 7

Pseudo code to open a collector
OPENCLTR: Open a collector {collector1}
  if collector1 is read protected
  then
    if the user is the owner of the collector1
    then display collector1 (DISPCLTR
    collector1)
    else
      if collector1's persistent storage
        area contains a link {link1} to
        another collector {collector2}
      and collector2 belongs to the user
      and link1 is marked read authorized or
        write authorized
      then display collector1 (DISPCLTR
      collector1)
      else
        if collector1's persistent storage
          area contains a link {link2} to
          a roster {roster1}
        and roster1 contains a link
          {link3} to a collector
          {collector3 }

TABLE 7-continued

```
and collector3 belongs to the user
and the link2 is marked read
   authorized or write authorized
then display collector1 (DISPCLTR
   collector1)
else error message
else display collector1 (DISPCLTR collector1)
```

TABLE 8

```
Pseudo code to display a collector
DISPCLTR: Display a collector
   display menu {news, copy this location, open
      your folder, copy & open, clipboard, users}
   display collector name
      display function buttons {cut; copy, paste,
         create, subscribe, forward, read authorize,
         write authorize, post authorize}
      display the items in the persistent storage
         area of the collector with checkboxes
```

When viewing collectors, buttons 1720, in addition to menubar 1705 are displayed to allow the user to manipulate the collector. The "cut" button moves the selected document or link into the user's clipboard. The "copy" button puts only a copy of the document or link into the user's clipboard. The "paste" button is used with button 1721 which will display three options so that the user can paste content of the clipboard below the selected documents or links, paste the content of the clipboard into the selected collector (if a collector is selected), or post the content of the clipboard to a selected collector, link or roster. The "create" button works with button 1722. The operation of the create button is similar to the "paste" button except that the "create" button is used to create new documents or links. The "edit" button allows the user to change the attributes of the selected documents. The "setting" button allows the user to set the attributes of selected links.

Table 9 provides the pseudo code to resolve the access control attributes necessary to execute the buttons on a collector in accordance with one embodiment of the present invention. Table 10 provides the pseudo code to actually execute the commands on the buttons of a collector.

TABLE 9

```
Pseudo code to resolve access control in collector
   EXECLTR1: Resolution of access control if buttons
      are pressed in a collector's {collector1}
      displayed image
   if collector1 is write protected
   and the pressed button is not the copy button
   then
      if the user is the owner of the collector1
      then perform button function (EXECLTR2)
      else
         if collector1's persistent storage
            area contains a link {link1} to
            another collector {collector2}
         and collector2 belongs to the user
         and link1 is marked write authorized
         then perform button function
            (EXECLTR2)
         else
            if collector1's persistent storage
               area contains a link {link2} to
               a roster {roster1}
            and roster1 contains a link to a
               collector {collector2}
```

TABLE 9-continued

```
and collector2 belongs to the user
and link2 is marked write
   authorized
then perform button
   function (EXECLTR2)
else error message
else perform button function(EXECLTR2)
```

TABLE 10

```
Pseudo code to execute collector buttons
EXECLTR2: Execution of commands if buttons are
   pressed in a collector's {collector1} displayed
   image
   switch
      case an item's checkbox is checked
         make the item's state 'selected'
      case 'cut' button pressed
         delete all items in the clipboard
         move selected items from collector1's
            persistent storage area to the clipboard
      case 'copy' button pressed
         delete all items in the clipboard
         copy selected items from collector1's
            persistent storage area to the clipboard
      case 'paste' button pressed
         copy all items in the clipboard to
            collector1's persistent storage area
         [distribute items appeared in collector1]
      case 'create collector' button pressed
         prompt the user to enter a collector
            {collector2} name
         get collector2's name as entered by the
            user
         prompt the user to select the protection
            level from read protected, write
            protected and not protected
         get the protection level selected by the
            user
         create a notifier section associated with
            collector2
         create collector2 in the persistent
            storage area of collector1 with the name
            and protection level specified above.
            {create a unix directory marked as a
               collector under the directory for
               collector1 and make it available as
               a Web page}
         [distribute collector2 appeared in
            collector1]
      case 'create roster' button pressed
         prompt the user to enter a roster
            {roster3} name
         get roster3's name as entered by the user
         prompt the user to select the protection
            level from read protected, write
            protected and not protected
         get the protection level selected by the
            user
         create roster3 in the persistent storage
            area of collector1 with the name and
            protection level specified above.
            {create a unix directory marked as a
               roster under the directory for
               collector1 and make it available as
               a Web page}
         [distribute roster3 appeared in
            collector1]
      case 'create link' button pressed
         prompt the user to enter a link {link1}
            name
         get link's name entered by the user
         prompt the user to enter the URL
         get the URL entered by the user
         create link1 in the persistent storage
            area of collector1 with the name and URL
```

TABLE 10-continued

```
          specified above.
              {create a unix file marked as a link
                 under the directory and store the
                 URL}
          [distribute link1 appeared in collector1]
       case 'create article' button pressed
          prompt the user to enter the article name
          get the article name entered by the user
          prompt the user to enter the contents of
              the article
          get contents of the article entered by the
              user
          create an article in the persistent
              storage area of collector1 with the name
              and contents specified above.
              {create a unix file marked as a link
                 under the directory and store the
                 URL}
          [distribute the new article appeared in
              collector1]
       case 'subscribe' button pressed
          if the selected item is a link to a
              collector or a link to a roster
          then mark the item as 'subscribed'
       case 'forward' button pressed
          if the selected item is a link to a
              collector or a link to a roster
          then mark the item as 'forwarding'
       case 'read authorize' button pressed
          if the selected item is a link to a
              collector or a link to a roster
          then mark the item as 'read authorized'
       case 'write authorize' button pressed
          if the selected item is a link to a
              collector or a link to a roster
          then mark the item as 'write authorized'
       case 'post authorize' button pressed
          if the selected item is a link to a
              collector or a link to a roster
          then mark the item as 'post authorized'
       [distribute items appeared in a collector
          {collector1 }]
          {This may or may not be an immediate
              action}
          if a collector {collector2} has a link
              {link1} to collector1
              and link1 is marked 'subscribed'
          then
              if link1 is marked 'with notification'
              then copy the items to collector2's
                 new storage area
              else
                 copy the items to collector2's
                    persistent storage area
                 [distribute the items appeared in
                    collector2]
          if a roster {roster1} has a link to
              collector1
          then [pushup the items to roster1]
          if collector1 contains a link {link3} to a
              collector {collector4}
              and link3 is marked 'forwarding'
          then
              if link3 is marked 'with notification'
              then copy the items to collector4's
                 new storage area
              else
                 copy the items to collector4's
                    persistent storage area
                 [distribute the items appeared in
                    collector4]
          if collector1 contains a link {link4} to a
              roster {roster2}
              and link4 is marked 'forwarding'
          then [pushdown the items to the roster2]
       [pushup items to a roster {roster1}]
          if a collector {collector5} has a link
              {link5} to roster1
              and link5 is marked 'subscribed'
```

TABLE 10-continued

```
          then
              if link5 is marked 'with notification'
              then copy the items to collector5's
                 new storage area
              else
                 copy the items to collector5's
                    persistent storage area
                 [distribute the items appeared in
                    collector5]
          if a roster {roster2} has a link to
              roster1
          then [pushup the items to roster2]
          if a roster {roster3} contains roster1
          then [pushup the items to roster3]
       [pushdown items to a roster {roster4}]
          if a collector {collector6} has a link
              {link5} to roster4
              and link5 is marked 'forwarding'
          then
              if link5 is marked 'with notification'
              then copy the items to collector6's
                 new storage area
              else
                 copy the items to collector6's
                    persistent storage area
                 [distribute the items appeared in
                    collector6]
          if a roster {roster5} has a link to
              roster1
          then [pushup the items to rosters1
```

Figure 18:
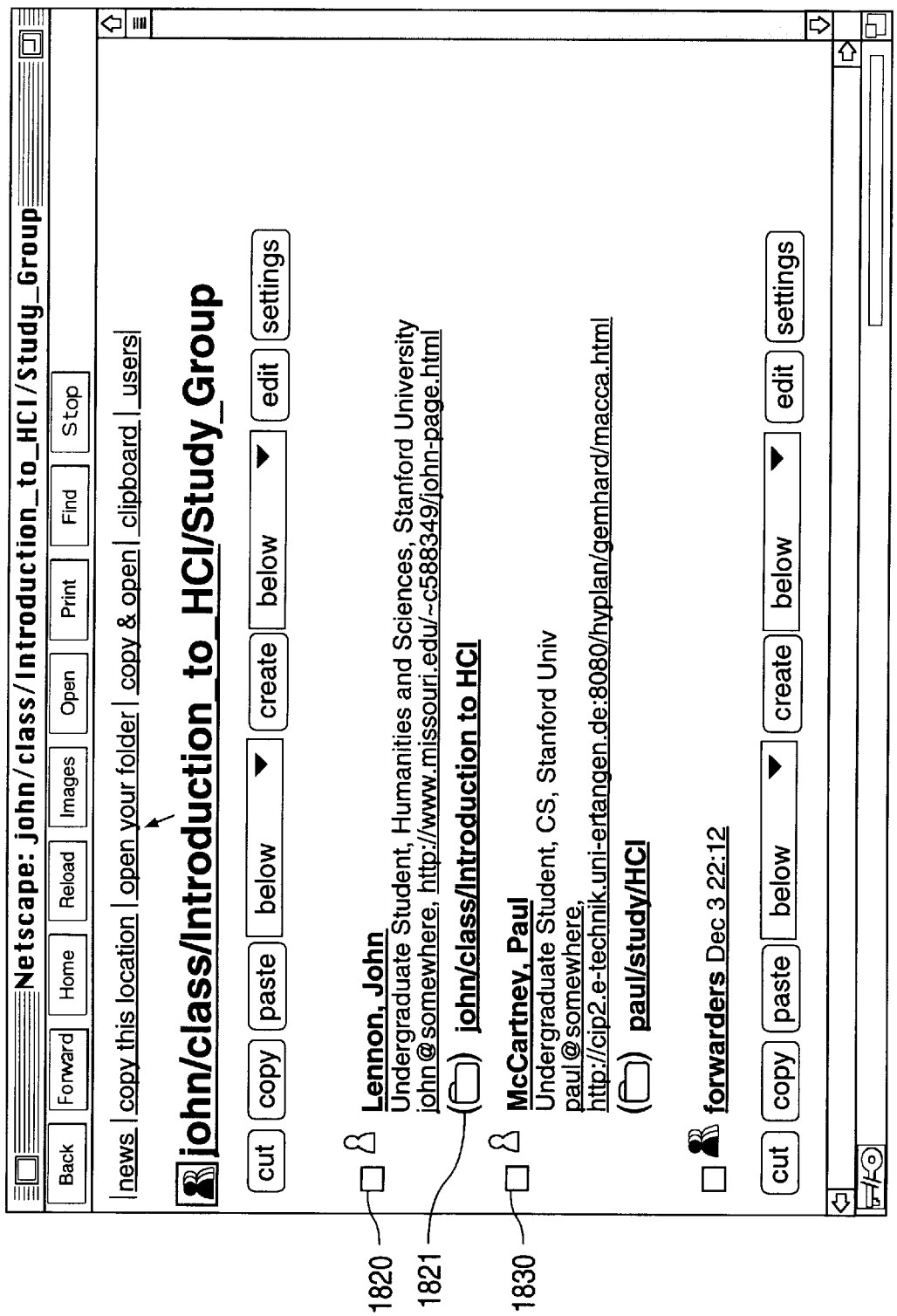
FIG. 18 shows a roster display in accordance with one embodiment of the present invention.

FIG. 18, shows one of John's rosters. The display of a roster is very similar to that of a collector. However, when a link to a collector is in the roster, the entry for the link displays the user information of the user who owns the link destination collector of the link. Thus entry 1820 displays the user information of John since the link of entry 1820 is to one of John's collector as shown by link identifier 1821. Similarly, the user information of Paul is displayed in entry 1830.

Table 11 and Table 12 provides the pseudo code to open and display a roster in accordance with one embodiment of the present invention.

TABLE 11

```
          Pseudo code to open a roster
       OPENROSTER: Open a roster {roster1}
          if roster1 is read protected
          then
              if the user is the owner of roster1
              then display roster1 (DISPROSTER roster1)
              else
                 if roster1's persistent storage area
                    contains a link {link1} to a
                    collector (collector1}
                    and collector1 belongs to the user
                    and link1 is marked read authorized or
                    write authorized
                 then display roster1 (DISPROSTER
                    roster1)
                 else
                    if roster1's persistent storage
                       area contains a link {link2} to
                       a roster {roster2}
                       and roster2 contains a link
                       {link3} to a collector
                       {collector2 }
                       and collector2 belongs to the user
                       and link2 is marked read
                       authorized or write authorized
                    then display roster1 (DISPROSTER
                       roster1)
                    else error message
```

TABLE 11-continued else display roster1 (DISPROSTER roster1)

TABLE 12

Pseudo code to display a roster
DISPROSTER: Display a roster
   display menu (news, copy this location, open
     your folder, copy & open, clipboard, users}
   display roster name
   display function buttons { cut, copy, paste,
     create, subscribe, forward, read authorize,
     write authdrize, post authorize }
   display the items in the persistent storage
     area of the roster with checkboxes

TABLE 13

Pseudo code to resolve access control in roster
EXEROSTER1: Resolution of access control when
  buttons are pressed in a roster's {roster1}
  displayed image.
    if roster1 is write protected
    and the pressed button is not the 'copy'
    button
    then
      if the user is the owner of roster1
      then perform button function (EXEROSTER2)
      else
        if roster1's persistent storage area
          contains a link {link1} to a
          collector {collector1})
        and collector1 belongs to the user
        and link1 is marked write authorized
        then perform button function
          (EXEROSTER2)
        else
          if roster1's persistent storage
            area contains a link {link2} to
            a roster
          and the roster contains a link
            {link3) to a collector
            {collector2})
          and collector2 belongs to the user
          and the link2 is marked write
            authorized
          then perform button function
            (EXEROSTER2)
          else error message
    else perform button function (EXEROSTER2)

TABLE 14

Pseudo code to execute roster buttons
EXEROSTER2: Execution of commends when buttons are
  pressed in a roster {roster1}
    switch
      case an item's checkbox is checked
        make the item's state 'selected'
      case 'cut' button pressed
        delete all items in the clipboard
        move selected items from roster1's
          persistent storage area to the clipboard
      case 'copy' button pressed
        delete all items in the clipboard
        copy selected items from roster1's
          persistent storage area to the clipboard
      case 'paste' button pressed
        copy all items in the clipboard to
          roster1's persistent storage area
      case 'create roster' button pressed
        prompt the user to enter a roster
          {roster2} name TABLE 14-continued get roster2's name as entered by the user
        prompt the user to select the protection
          level from read protected, write
          protected and not protected
        get the protection level selected by the
          user
        create roster2 in the persistent storage
          area of roster1 with the name and
          protection level specified above.
            {create a unix directory marked as a
              roster under the directory for
              roster1 and make it available as a
              Web page}
      case 'create link' button pressed
        prompt the user to enter a link {linkl}
          name
        get link1's name as entered by the user
        prompt the user to enter the URL
        get the URL entered by the user
        create link1 in the persistent storage
          area of roster1 with the name and URL
          specified above
            {create a unix file marked as a link
              under the directory and store the
              URL}
      case 'read authorize' button pressed
        if the selected item is a link to a
          collector or a link to a roster
        then mark the item as 'read authorized'
      case 'write authorize' button pressed
        if the selected item is a link to a
          collector or a link to a roster
        then mark the item as 'write authorized'
      case 'post authorize' button pressed
        if the selected item is a link to a
          collector or a link to a roster
        then mark the item as 'post authorized The various embodiments of the structure and method of this invention that are described above are illustrative only of the principles of this invention and are not intended to limit the scope of the invention to the particular embodiments described. In view of this disclosure, those skilled-in-the-art can define other implementations of linking documents, arranging collectors, transferring information, user interfaces, and use these alternative features to create a method or system of communication, information management or organizing human resources according to the principles of this invention.

We claim:

1. A system for receiving electronic information on a computer network, comprising:

a first electronic information collector in a first user account, said first electronic information collector having a first collector address wherein said first electronic information collector comprises a post input port and a paste input port;

a second electronic information collector in said first user account, said second electronic information collector having a second collector address;

wherein a first electronic message sent to said first collector address is received in said first collector; and wherein a second electronic message sent to said second collector address is received in said second collector.

2. The system of claim 1, further comprising a notifier having a first notifier section associated with said first electronic information collector.

3. The system of claim 2, wherein said first electronic message is received through said post input port of said first electronic information collector and displayed in said first notifier section.

4. The system of claim 2, wherein said first electronic message is received through said paste input port of said first electronic information collector and displayed in said first electronic collector.

5. The system of claim 4, wherein
said second electronic information collector comprises a post input port and a paste input port;
said notifier has a second notifier section associated with said second electronic information collector;
said second electronic message is received through said post input port of said second electronic information collector and displayed in said second notifier section.

6. The system of claim 4, wherein
said second electronic information collector comprises a post input port and a paste input port;
said notifier has a second notifier section associated with said second electronic information collector;
said second electronic message is received through said paste input port of said second electronic information collector and displayed in said second electronic collector.

7. The system of claim 1, further comprising
a first notifier section of a notifier associated with said first electronic information collector to display said first message; and
a second notifier section of said notifier associated with said second electronic information collector to display said second message.

8. The system of claim 1, wherein said first message originates from a second user account.

9. The system of claim 8, wherein said second message originates from said second user account.

10. The system of claim 8, wherein said second message originates from a third user account.

11. The system of claim 1, further comprising
a third electronic information collector in a second user account, said third electronic information collector having a third collector address;
a roster having a roster address, a first link to said first electronic information collector and a second link to said third electronic information collector;
wherein a third electronic message sent to said roster address is copied to said first electronic information collector and copied to said third electronic information collector.

12. A system for information management comprising:
a first collector; a second collector;
a link from said first collector to said second collector, said link having a flow direction attribute and having a notification attribute;
a first notifier section associated with said first collector;
a second notifier section associated with said second collector;
and wherein said first collector comprises a first new storage area and a first persistent storage area; and
said second collector comprises a second new storage area and a second persistent storage area.

13. The system of claim 12, wherein if said flow direction attribute is in forward mode and said notification attribute is activated, a document placed within said first persistent storage area is copied to said second new storage area and viewable in said second notifier section.

14. The system of claim 12, wherein if said flow direction attribute is in forward mode and said notification attribute is deactivated, a document placed within said first persistent storage area is copied to said second persistent storage area and viewable in said second collector.

15. The system of claim 12, wherein if said flow direction attribute is in subscription mode and said notification attribute is activated, a document placed within said second persistent storage area is automatically copied into said first new storage area and viewable in said first notifier section.

16. The system of claim 12, wherein if said flow direction attribute is in subscription mode and said notification attribute is deactivated, a document placed within said second persistent storage area is automatically copied into said first persistent storage area and viewable in said first collector.

* * * * *